US010275108B2

(12) United States Patent
Iuchi et al.

(10) Patent No.: US 10,275,108 B2
(45) Date of Patent: Apr. 30, 2019

(54) DETECTING APPARATUS AND DISPLAY APPARATUS

(71) Applicant: Japan Display Inc., Tokyo (JP)

(72) Inventors: Shinya Iuchi, Tokyo (JP); Taiki Kasai, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/163,984

(22) Filed: Oct. 18, 2018

(65) Prior Publication Data

US 2019/0050089 A1 Feb. 14, 2019

Related U.S. Application Data

(63) Continuation of application No. 15/465,866, filed on Mar. 22, 2017, now Pat. No. 10,139,976.

(30) Foreign Application Priority Data

Mar. 29, 2016 (JP) .................................. 2016-066717

(51) Int. Cl.
G06F 3/041 (2006.01)
G06F 3/044 (2006.01)

(52) U.S. Cl.
CPC ............ *G06F 3/044* (2013.01); *G06F 3/0412* (2013.01); *G06F 3/0414* (2013.01); *G06F 3/0416* (2013.01); *G06F 2203/04112* (2013.01)

(58) Field of Classification Search
CPC ...... G06F 3/044; G06F 3/0416; G06F 3/0414; G06F 3/0412; G06F 2203/04112
See application file for complete search history.

(56) References Cited

U.S. PATENT DOCUMENTS

| 2013/0018489 A1* | 1/2013 | Grunthaner | G06F 3/041 700/73 |
| 2014/0118308 A1* | 5/2014 | Rhee | G06F 3/0383 345/177 |
| 2014/0139444 A1* | 5/2014 | Kauhanen | G06F 3/041 345/173 |
| 2015/0002452 A1* | 1/2015 | Klinghult | G06F 3/0416 345/174 |
| 2015/0331517 A1 | 11/2015 | Filiz et al. | |
| 2015/0370376 A1* | 12/2015 | Harley | G06F 3/0414 345/174 |
| 2016/0062503 A1* | 3/2016 | Lee | G01L 1/2206 345/174 |
| 2016/0239136 A1* | 8/2016 | Kocak | G06F 3/0412 |
| 2017/0285799 A1* | 10/2017 | Iuchi | G06F 3/0414 |

FOREIGN PATENT DOCUMENTS

| JP | 07-005841 A | 1/1995 |
| JP | 2006-251927 A | 9/2006 |
| JP | 2013-186501 A | 9/2013 |
| JP | 2014-86094 A | 5/2014 |

* cited by examiner

Primary Examiner — Andrew Sasinowski
(74) Attorney, Agent, or Firm — Michael Best & Friedrich LLP

(57) ABSTRACT

According to an aspect, a detecting apparatus includes: a touch detection electrode provided along a touch detection surface; a strain gauge integrated with the touch detection electrode.

8 Claims, 34 Drawing Sheets

DETECTING APPARATUS AND DISPLAY APPARATUS

CROSS-REFERENCE TO RELATED APPLICATIONS

The present application is a Continuation of application Ser. No. 15/465,866, filed Mar. 22, 2017, which claims priority from Japanese Application No. 2016-066717, filed on Mar. 29, 2016, the contents of which are incorporated by reference herein in its entirety.

BACKGROUND

1. Technical Field

The present invention relates to a detecting apparatus and a display apparatus.

2. Description of the Related Art

Display apparatuses have been required to detect a touch operation performed on a display surface and detect pressing force or force applied to the display surface by the touch operation. There have been developed simple techniques for satisfying the requirement, including a technique described in Japanese Patent Application Laid-open Publication No. 2013-186501 (JP-A-2013-186501), for example. The technique described in JP-A-2013-186501 includes both a touch sensor that detects a touch operation performed on a display surface of a display apparatus and a force sensor that detects force applied to the display surface.

SUMMARY

According to an aspect, a detecting apparatus includes: a touch detection electrode provided along a touch detection surface; a strain gauge integrated with the touch detection electrode.

According to another aspect, a display apparatus in which a plurality of pixels are arranged in a matrix includes: a drive electrode used to drive the pixels; and a strain gauge integrated with the drive electrode.

DETAILED DESCRIPTION

Figure 1:
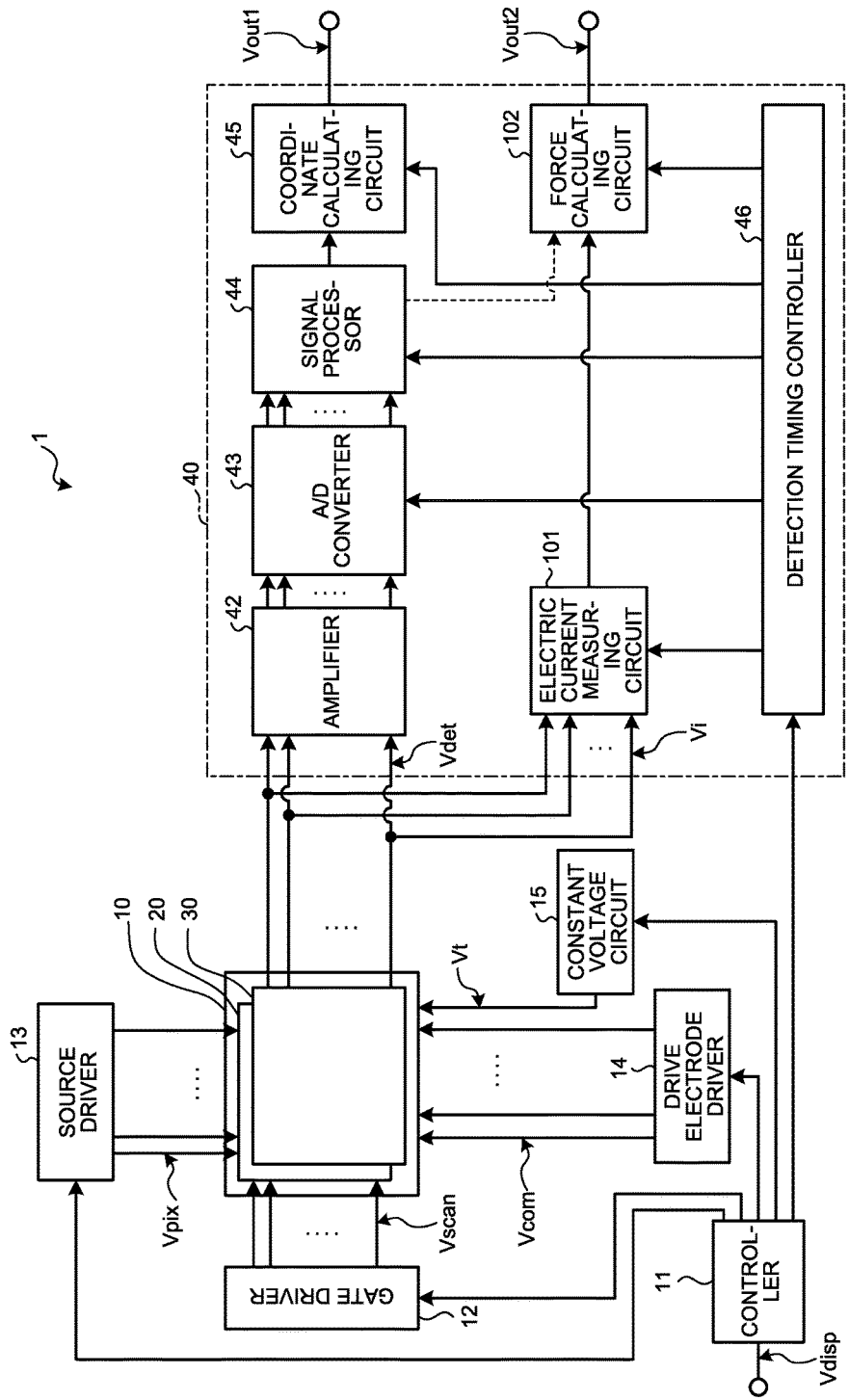
FIG. 1 is a block diagram of an exemplary configuration of a display apparatus with a touch detection function according to a first embodiment.

Exemplary embodiments according to the present invention are described below with reference to the accompanying drawings. The disclosure is given by way of example only, and appropriate changes made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the specification and the figures, components similar to those previously described with reference to preceding figures are denoted by the same reference numerals, and detailed explanation thereof may be appropriately omitted.

In this disclosure, when an element is described as being "on" another element, the element can be directly on the other element, or there can be one or more elements between the element and the other element.

A conventional touch sensor and force sensor require a space for parts, wiring, and other components for their configurations, thereby placing restrictions on arrangement of parts, wiring, and other components for other configurations. If both the conventional touch sensor and the conventional force sensor are simply provided in one apparatus, the apparatus is more difficult to design. Even if the apparatus can be designed, the cost increases because of dedicated components provided in their respective configurations, for example.

For the foregoing reasons, there is a need for a detecting apparatus and a display apparatus that can detect force with a configuration integrated with a component used for another configuration.

First Embodiment

FIG. 1 is a block diagram of an exemplary configuration of a display apparatus with a touch detection function according to a first embodiment of the present invention. A display apparatus with a touch detection function 1 includes a display device with a touch detection function 10, a controller 11, a gate driver 12, a source driver 13, a drive electrode driver 14, a constant voltage circuit 15, and a touch detector 40. The display apparatus with a touch detection function 1 is a display device in which the display device with a touch detection function 10 includes a touch detection function. The display device with a touch detection function 10 is a device in which a liquid crystal display device 20 is integrated with a capacitive touch detecting device 30. The liquid crystal display device 20 is a liquid crystal display device including liquid crystal display elements serving as display elements. The display device with a touch detection function 10 may be a device in which the capacitive touch detecting device 30 is mounted on the liquid crystal display device 20 including liquid crystal display elements serving as display elements. The liquid crystal display device 20 may be an organic electroluminescence (EL) display device, for example.

The liquid crystal display device 20 sequentially performs scanning based on a scanning signal Vscan supplied from the gate driver 12, thereby performing display. The controller 11 is a circuit that supplies control signals to the gate driver 12, the source driver 13, the drive electrode driver 14, and the touch detector 40 based on video signals Vdisp supplied from the outside, thereby performing control such that the gate driver 12, the source driver 13, the drive electrode driver 14, and the touch detector 40 operate synchronously with one another.

The gate driver 12 has a function to supply the scanning signal Vscan to scanning lines GCL coupled to sub-pixels SPix serving as a target of display drive in the display device with a touch detection function 10 based on the control signal supplied from the controller 11.

The source driver 13 is a circuit that supplies pixel signals Vpix to the sub-pixels SPix, which will be described later, of the display device with a touch detection function 10 based on the control signal supplied from the controller 11.

The drive electrode driver 14 is a circuit that supplies a drive signal Vcom to drive electrodes COML, which will be described later, of the display device with a touch detection function 10 based on the control signal supplied from the controller 11.

The constant voltage circuit 15 is a circuit that supplies constant voltage Vt to force detectors 71 and 72, which will be described later, of the display device with a touch detection function 10 based on the control signal supplied from the controller 11.

The touch detector 40 is a circuit that determines whether a touch operation (a contact or proximate state, which will be described later) is performed on the touch detecting device 30 based on the control signal supplied from the controller 11 and on touch detection signals Vdet supplied from the touch detecting device 30 of the display device with a touch detection function 10. If a touch operation is detected, the touch detector 40 derives coordinates of the touch operation in a touch detection area, for example. The touch detector 40 includes an amplifier 42, an analog to digital converter (ADC) 43, a signal processor 44, a coordinate calculating circuit 45, a detection timing controller 46, an electric current measuring circuit 101, and a force calculating circuit 102, for example.

The amplifier 42 amplifies the touch detection signals Vdet supplied from the touch detecting device 30. The amplifier 42 may include a low-pass analog filter that removes high-frequency components (noise components) included in the touch detection signals Vdet to extract and output touch components.

Figure 2:
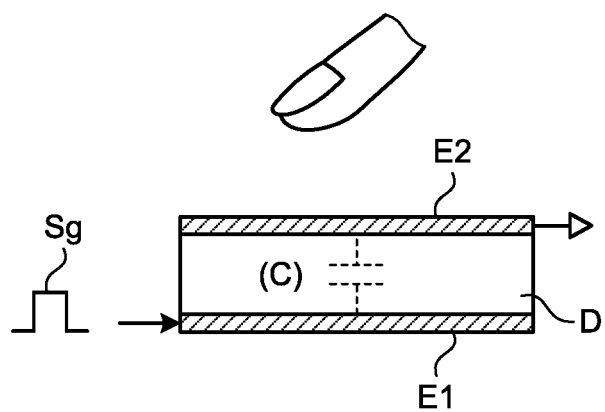
FIG. 2 is a diagram for explaining the basic principle of a capacitive touch detection system and illustrates a state where a finger is neither in contact with nor in proximity to a touch detection electrode.
Figure 3:
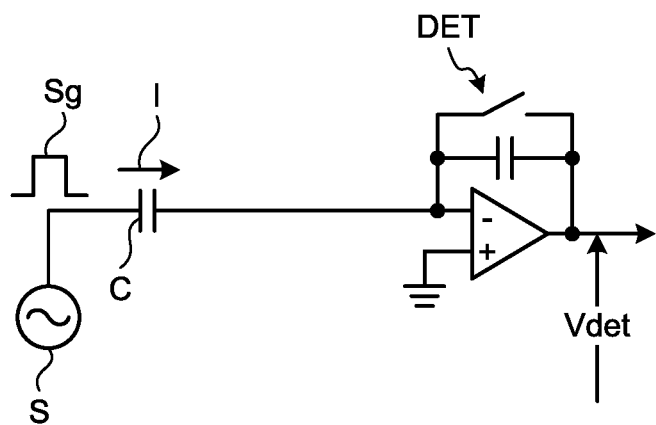
FIG. 3 is a diagram for explaining an example of an equivalent circuit in the state where a finger is neither in contact with nor in proximity to the touch detection electrode as illustrated in FIG. 2.
Figure 4:
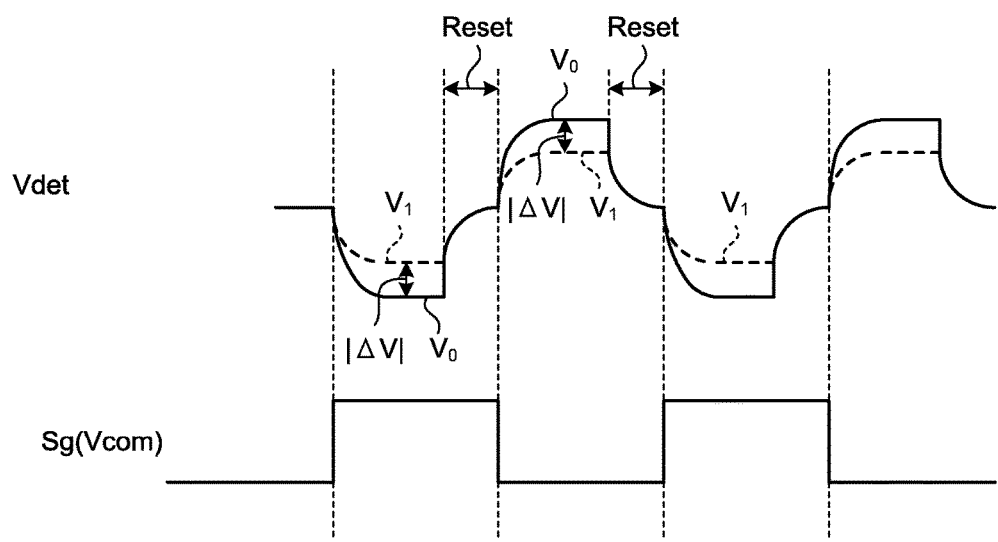
FIG. 4 is a diagram of an example of waveforms of a drive signal and a touch detection signal.

The touch detecting device 30 operates based on the basic principle of capacitive touch detection to output the touch detection signals Vdet. The following describes the basic principle of touch detection in the display apparatus with a touch detection function 1 according to the first embodiment with reference to FIGS. 1 to 4. FIG. 2 is a diagram for explaining the basic principle of a capacitive touch detection system and illustrates a state where a finger is neither in contact with nor in proximity to a touch detection electrode. FIG. 3 is a diagram for explaining an example of an equivalent circuit in the state where a finger is neither in contact with nor in proximity to the touch detection electrode as illustrated in FIG. 2. FIG. 4 is a diagram of an example of waveforms of a drive signal and a touch detection signal.

As illustrated in FIG. 2, for example, a capacitance element C includes a pair of electrodes, that is, a drive electrode E1 and a touch detection electrode E2 facing each other with a dielectric D interposed therebetween. The capacitance element C accumulates electric charges according to its capacitance, thereby forming an electric field. As illustrated in FIG. 3, a first end of the capacitance element C is coupled to an alternating-current (AC) signal source (drive signal source) S, whereas a second end thereof is coupled to a voltage detector (touch detector) DET. The voltage detector DET is an integration circuit included in the amplifier 42 illustrated in FIG. 1, for example.

When the AC signal source S applies an AC rectangular wave Sg having a predetermined frequency (e.g., frequency on the order of several kilohertz to several hundred kilohertz) to the drive electrode E1 (first end of the capacitance element C), an output waveform (touch detection signal Vdet) is generated via the voltage detector DET coupled to the touch detection electrode E2 (second end of the capacitance element C). The AC rectangular wave Sg corresponds to a touch drive signal Vcomt, which will be described later.

In a state where a finger is neither in contact with nor in proximity to the touch detection electrode (non-contact state), an electric current I corresponding to the capacitance value of the capacitance element C flows with charge and discharge of the capacitance element C. As illustrated in FIG. 4, the voltage detector DET converts change in the electric current I in relation to the AC rectangular wave Sg into change in voltage (waveform $V_0$ indicated by the solid line).

By contrast, in a state where a finger is in contact with or in proximity to the touch detection electrode (contact state), capacitance formed by the finger is in contact with or in proximity to the touch detection electrode E2. In this state, fringe capacitance between the drive electrode E1 and the touch detection electrode E2 is blocked. As a result, the capacitance element C acts as a capacitance element having a capacitance value smaller than that in the non-contact state. The electric current I that changes depending on a change in the capacitance element C flows. As illustrated in FIG. 4, the voltage detector DET converts change in the electric current I in relation to the AC rectangular wave Sg into change in voltage (waveform $V_1$ indicated by the dotted line). In this case, the waveform $V_1$ has amplitude smaller than that of the waveform $V_0$. An absolute value $|\Delta V|$ of voltage difference between the waveform $V_0$ and the waveform $V_1$ varies depending on an effect of an external proximate object, such as a finger. To accurately detect the absolute value $|\Delta V|$ of the voltage difference between the waveform $V_0$ and the waveform $V_1$, the voltage detector DET preferably operates having a period Reset for resetting charge and discharge of the capacitance element synchronously with the frequency of the AC rectangular wave Sg by switching in the circuit.

The touch detecting device 30 illustrated in FIG. 1 sequentially scans each detection block based on the drive signal Vcom (touch drive signal Vcomt) supplied from the drive electrode driver 14, thereby performing touch detection.

The touch detecting device 30 outputs the touch detection signals Vdet of respective detection blocks from a plurality of touch detection electrodes TDL, which will be described later, via the voltage detector DET illustrated in FIG. 3. The touch detecting device 30 supplies the touch detection signals Vdet to the ADC 43 of the touch detector 40.

The ADC 43 is a circuit that samples an analog signal that is output from the amplifier 42 at a timing synchronized with the drive signal Vcom to convert the analog signal into digital signal. If the touch detector 40 is supplied with signals the intensity and the signal-to-noise (S/N) ratio of which are sufficiently high for the processing performed by the signal processor 44, the amplifier 42 does not necessarily provided.

The signal processor 44 includes a digital filter that reduces frequency components (noise components) having frequencies other than the frequency at which the drive signal Vcom is sampled in the output signals from the ADC 43. The signal processor 44 is a logic circuit that determines whether a touch operation is performed on the touch detecting device 30 based on the output signals from the ADC 43. The signal processor 44 performs processing of extracting only the voltage of difference caused by a finger. The voltage of difference caused by a finger corresponds to the absolute value $|\Delta V|$ of the difference between the waveform $V_0$ and the waveform $V_1$. The signal processor 44 may perform an arithmetic operation for averaging the absolute values $|\Delta V|$ per detection block, thereby calculating the average of the absolute values $|\Delta V|$. With this operation, the signal processor 44 can reduce an effect of noise. If the signal processor 44 fails to extract the voltage of difference, it is determined that an external proximate object is neither in contact with nor in proximity to the touch detecting device 30. By contrast, if the signal processor 44 can extract the voltage of difference, it is determined that an external proximate object is in contact with or in proximity to the touch detecting device 30. Higher voltage of difference indicates that an external proximate object is in proximity to the touch detecting device 30 at a closer position or in contact therewith. As described above, the touch detector 40 can perform touch detection.

The signal processor 44 according to the first embodiment calculates force detected by force detectors based on the outputs from the touch detection electrodes TDL serving as the touch detection electrode E2. Each of the force detectors is integrated with a corresponding one of the touch detection electrodes TDL. The output from the touch detection electrode TDL is an electric current Vi that is output in accordance with application of voltage from the constant voltage circuit 15, for example. The force detectors include the force detector 71 and the force detector 72, for example. The force in the present specification includes not only force per unit area but also simple pressing force.

The coordinate calculating circuit 45 is a logic circuit that derives, when the signal processor 44 detects a touch operation, the touch panel coordinates of the touch operation. Specifically, for example, the coordinate calculating circuit 45 derives the coordinates of a position corresponding to a combination of the touch detection electrode TDL and the drive electrode COML, the touch detection electrode TDL being determined to be in the contact state with an external proximate object and outputting the touch detection signal Vdet, and the drive electrode COML being driven at the timing when the touch detection signal Vdet is output. The coordinates obtained by the coordinate calculating circuit 45 are handled as the touch panel coordinates at which the touch operation is detected. The coordinate calculating circuit 45 outputs a signal output Vout1 as the touch panel coordinates.

The detection timing controller 46 is a logic circuit that performs control such that the ADC 43, the signal processor 44, and the coordinate calculating circuit 45 operate synchronously with one another.

The electric current measuring circuit 101 is a circuit that measures the value of the electric current Vi, which will be described later, and transmits an output indicating the measurement result to the force calculating circuit 102. The force calculating circuit 102 is a logic circuit that calculates distribution of force applied to the display apparatus with a touch detection function 1 by a touch operation. The force calculating circuit 102 calculates the distribution of force based on the value of the electric current Vi measured by the electric current measuring circuit 101 and on previously stored information on the positional relation between the force detectors (e.g., the force detectors 71 and 72) integrated with the corresponding touch detection electrodes TDL. By using the result of the arithmetic operation, the force calculating circuit 102 can identify the touch panel coordinates to which the largest force is applied by a touch operation, for example. The force calculating circuit 102 outputs a signal output Vout2 as the result of the arithmetic operation.

Figure 5:
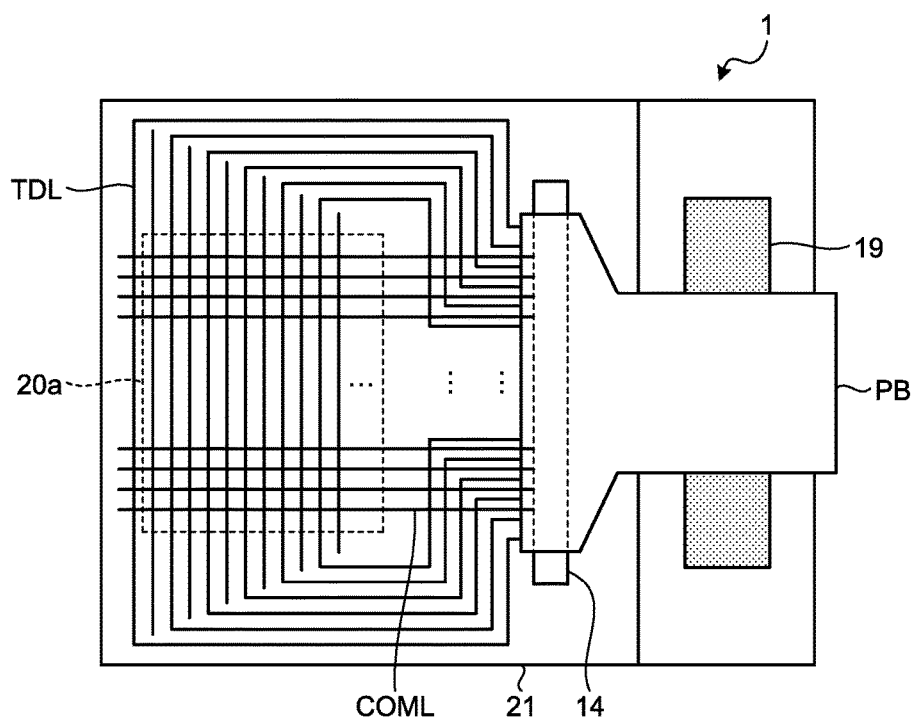
FIG. 5 is a diagram of an example of a module provided with the display apparatus with a touch detection function.

FIG. 5 is a diagram of an example of a module provided with the display apparatus with a touch detection function 1. As illustrated in FIG. 5, to mount the display apparatus with a touch detection function 1 on the module, the drive electrode driver 14 may be provided on a grass substrate 21.

The display apparatus with a touch detection function 1 includes the display device with a touch detection function 10, the drive electrode driver 14, a chip on glass (COG) 19, and a printed circuit board PB, for example. FIG. 5 schematically illustrates the positional relation in planar view of the drive electrodes COML and the touch detection electrodes TDL intersecting with the drive electrodes COML in a grade separated manner. The drive electrodes COML, for example, extend in a direction along a first side of the display device with a touch detection function 10. The touch detection electrodes TDL, for example, extend in a direction along a second side intersecting with the first side of the display device with a touch detection function 10. The output ends are coupled to the touch detector 40 provided outside the module via a terminal such as the printed circuit board PB and other components provided on the second side of the display device 10 with a touch detection function. The drive electrode driver 14 is provided at the glass substrate 21. The COG 19 is a chip mounted on the glass substrate 21 and includes circuits required for a display operation, such as the controller 11, the gate driver 12, and the source driver 13 illustrated in FIG. 1. The printed circuit board PB is a flexible printed circuit board provided with wiring, for example. The printed circuit board PB, for example, serves as wiring that couples the touch detection electrodes TDL to the touch detector 40, which is not illustrated in FIG. 5. The printed circuit board PB also serves as wiring that outputs the signal output Vout1 and the signal output Vout2 to the outside.

Figure 6:
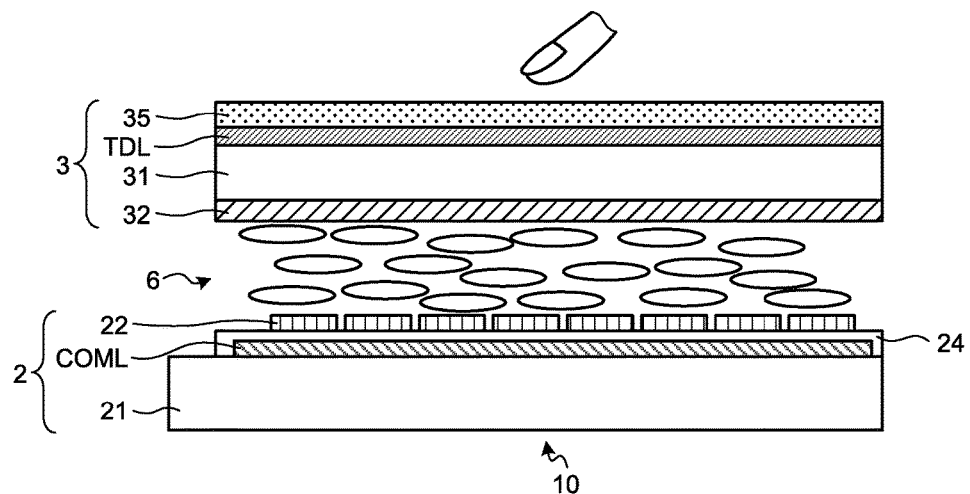
FIG. 6 is a sectional view of a schematic structure of a display device with a touch detection function according to the first embodiment.
Figure 7:
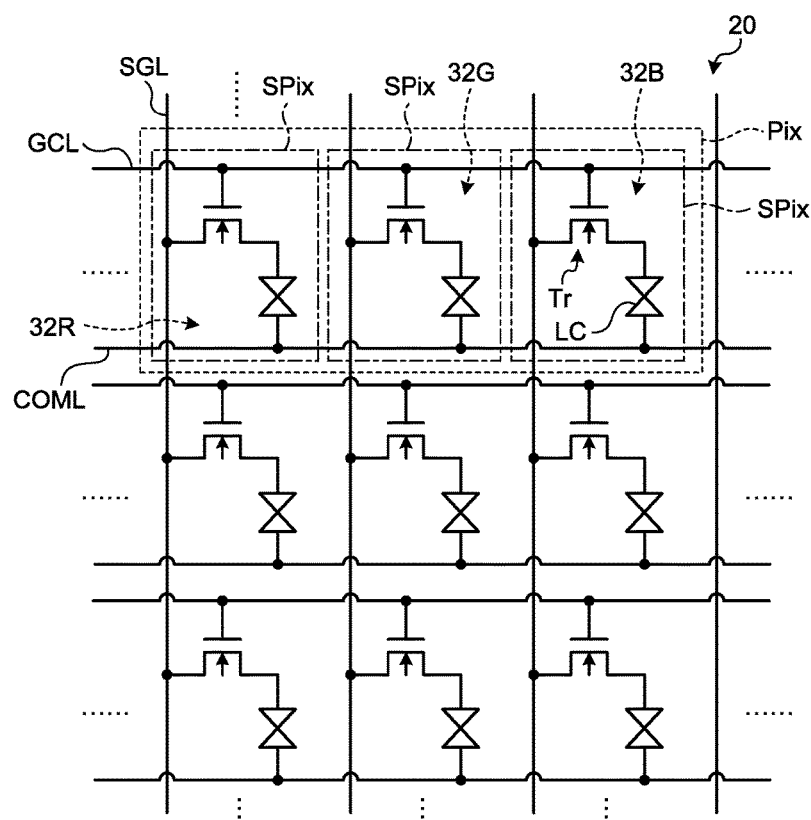
FIG. 7 is a circuit diagram of arrangement of pixels in the display device with a touch detection function according to the first embodiment.

The following describes an exemplary configuration of the display device with a touch detection function 10 in detail. FIG. 6 is a sectional view of a schematic structure of the display device with a touch detection function 10 according to the first embodiment. FIG. 7 is a circuit diagram of arrangement of pixels in the display device with a touch detection function 10 according to the first embodiment. The display device with a touch detection function 10 includes a first substrate 2, a second substrate 3, and a liquid crystal layer 6. The second substrate 3 faces the first substrate 2 in a direction perpendicular to the surface of the first substrate 2. The liquid crystal layer 6 is arranged between the first substrate 2 and the second substrate 3.

The first substrate 2 includes the glass substrate 21, a plurality of pixel electrodes 22, a plurality of drive electrodes COML, and an insulation layer 24. The pixel electrodes 22 are arranged in a matrix on the upper side of the glass substrate 21. The drive electrodes COML are provided between the glass substrate 21 and the pixel electrodes 22. The insulation layer 24 electrically insulates the pixel electrodes 22 from the drive electrodes COML. The glass substrate 21 is provided with thin-film transistor (TFT) elements Tr of the corresponding sub-pixels SPix illustrated in FIG. 7 and wiring, such as signal lines SGL and scanning lines GCL. The signal line SGL supplies the pixel signal Vpix to the pixel electrode 22 illustrated in FIG. 6, and the scanning line GCL drives the TFT element Tr. The signal line SGL extends on a plane parallel to the surface of the glass substrate 21 and supplies the pixel signal Vpix for displaying an image on the pixel. The liquid crystal display device 20 illustrated in FIG. 7 includes a plurality of sub-pixels SPix arranged in a matrix. The sub-pixels SPix each include the TFT element Tr and a display element (e.g., a liquid crystal element LC). The TFT element Tr is a thin-film transistor and is an n-channel metal oxide semiconductor (MOS) TFT in this example. One of the source and the drain of the TFT element Tr is coupled to the signal line SGL, the gate thereof is coupled to the scanning line GCL, and the other of the source and the drain thereof is coupled to a first end of the liquid crystal element LC. The first end of the liquid crystal element LC is coupled to the other of the source and the drain of the TFT element Tr, and a second end thereof is coupled to the drive electrode COML. The liquid crystal element LC includes a corresponding one of the pixel electrodes 22, for example, and the pixel electrode 22 is coupled to the drain of the TFT element Tr. The liquid crystal elements LC are coupled to the drive electrodes COML via the insulation layer 24 and the liquid crystal layer 6. The sub-pixels SPix are driven by electric charges supplied to the pixel electrodes 22 and the drive electrodes COML. The pixel electrodes 22 and the drive electrodes COML thus serve as electrodes used to drive the sub-pixels SPix. The drive electrodes COML, the insulation layer 24, and the pixel electrodes 22 according to the present embodiment are layered in this order on the glass substrate 21. The configuration is not limited thereto, and the pixel electrodes 22, the insulation layer 24, and the drive electrodes COML may be layered in this order on the glass substrate 21. Alternatively, the pixel electrodes 22 and the drive electrodes COML may be provided in a single layer with the insulation layer 24 interposed therebetween.

The sub-pixel SPix illustrated in FIG. 7 is coupled to other sub-pixels SPix belonging to the same row in the liquid crystal display device 20 by the scanning line GCL. The scanning line GCL is coupled to the gate driver 12 and supplied with the scanning signal Vscan from the gate driver 12. The sub-pixel SPix is coupled to other sub-pixels SPix belonging to the same column in the liquid crystal display device 20 by the signal line SGL. The signal line SGL is coupled to the source driver 13 and supplied with the pixel signal Vpix from the source driver 13. The sub-pixel SPix is also coupled to the other sub-pixels SPix belonging to the same row in the liquid crystal display device 20 by the drive electrode COML. The drive electrode COML is coupled to the drive electrode driver 14 and supplied with the drive signal Vcom from the drive electrode driver 14.

The gate driver 12 illustrated in FIG. 1 applies the scanning signal Vscan to the gates of the TFT elements Tr of the pixels Pix via the scanning line GCL illustrated in FIG. 7. As a result, the gate driver 12 sequentially selects, as a target of display drive, sub-pixels SPix that share one scanning line GCL in one row (one horizontal line) out of the sub-pixels SPix arranged in a matrix in the liquid crystal display device 20. The source driver 13 illustrated in FIG. 1 supplies the pixel signals Vpix to the sub-pixels SPix sequentially selected by the gate driver 12 via the signal lines SGL illustrated in FIG. 7. These sub-pixels SPix perform display output based on the supplied pixel signals Vpix. The drive electrode driver 14 illustrated in FIG. 1 applies the drive signal Vcom, thereby driving the drive electrodes COML in each block composed of a predetermined number of drive electrodes COML. The extending directions of the drive electrodes COML and the touch detection electrodes TDL may be appropriately changed. While the drive electrodes COML illustrated in FIG. 7 extend in the same direction as the aligning direction of the sub-pixels SPix constituting the pixel Pix, the extending direction of the drive electrodes COML may be orthogonal to the aligning direction. The touch detection electrodes TDL and the drive electrodes COML simply need to overlap in an intersecting manner, and they need not intersect with each other at right angles in planar view.

The gate driver 12 drives to sequentially linearly scan the scanning lines GCL in the liquid crystal display device 20 in a time-division manner. The drive electrode driver 14 applies the drive signal Vcom to the block including the drive electrodes COML corresponding to the positions provided with the sub-pixels SPix supplied with the pixel signals Vpix from the source driver 13.

Figure 8:
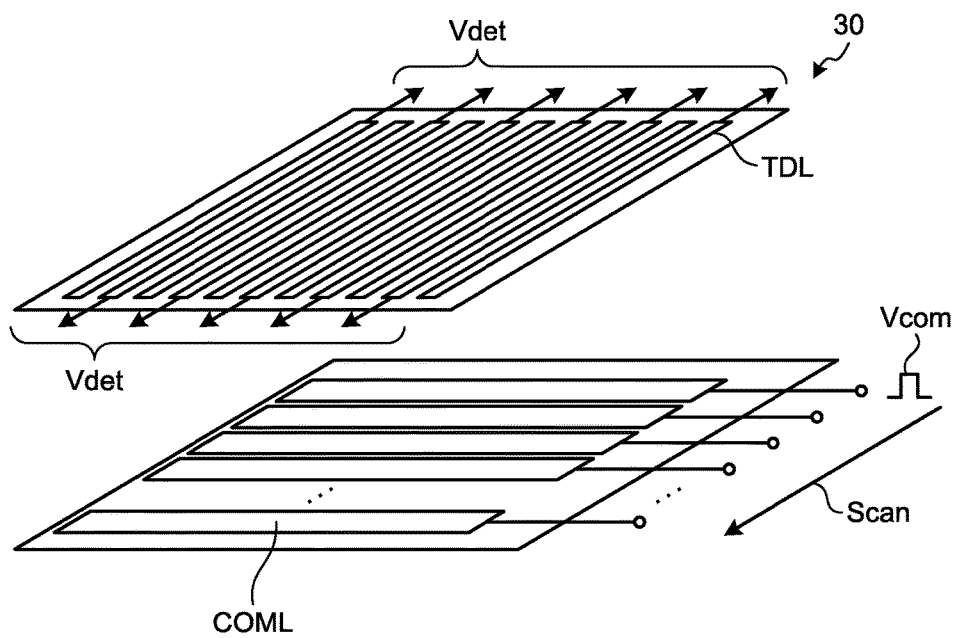
FIG. 8 is a perspective view of an exemplary configuration of drive electrodes and touch detection electrodes in the display device with a touch detection function according to the first embodiment.

The drive electrodes COML according to the first embodiment serve not only as drive electrodes of the liquid crystal display device 20 but also as drive electrodes of the touch detecting device 30. FIG. 8 is a perspective view of an exemplary configuration of the drive electrodes and the touch detection electrodes in the display device with a touch detection function according to the first embodiment. The drive electrodes COML illustrated in FIG. 8 face the pixel electrodes 22 in the direction perpendicular to the surface of the glass substrate 21 as illustrated in FIG. 6. The touch detecting device 30 includes the drive electrodes COML provided in the first substrate 2 and the touch detection electrodes TDL provided in the second substrate 3. The touch detection electrodes TDL are stripe electrode patterns extending in a direction intersecting with the extending direction of the electrode patterns of the drive electrodes COML. The touch detection electrodes TDL face the drive electrodes COML in the direction perpendicular to the surface of the glass substrate 21. The electrode patterns of the touch detection electrodes TDL are coupled to the input side of the amplifier 42 of the touch detector 40. The electrode patterns of the drive electrodes COML and the touch detection electrodes TDL intersecting with each other form capacitance at the intersections. As described above, the display apparatus with a touch detection function 1 includes the drive electrodes (drive electrodes COML) that are not in contact with the touch detection electrodes (touch detection electrodes TDL) to form capacitance between the touch detection electrodes and the drive electrodes. The touch detection electrodes TDL or the drive electrodes COML (drive electrode blocks) do not necessarily have a shape of stripe patterns in which a plurality of electrodes (blocks) are separated from each other. The touch detection electrodes TDL or the drive electrodes COML (drive electrode blocks) may have a comb shape, for example. The touch detection electrodes TDL or the drive electrodes COML (drive electrode blocks) simply need to have a shape in which a plurality of electrodes are separated from each other. The shape of slits that separate the drive electrodes COML may be a straight line or a curved line.

With this configuration, to perform a touch detection operation in the touch detecting device 30, the drive electrode driver 14 drives to sequentially scan the drive electrode blocks in a time-division manner. As a result, each detection block of the drive electrodes COML is sequentially selected in a scanning direction Scan. The touch detection electrodes TDL each output the touch detection signal Vdet. The touch detecting device 30 thus performs touch detection on one detection block. In other words, the drive electrode blocks correspond to the drive electrode E1 in the basic principle of touch detection, whereas the touch detection electrodes TDL correspond to the touch detection electrode E2. The touch detecting device 30 detects a touch operation according to the basic principle. The touch detecting device 30 thus performs touch detection on a screen side (display surface side) of the display device (liquid crystal display device 20). As illustrated in FIG. 8, the electrode patterns intersecting with each other serve as a capacitive touch sensor formed in a matrix. The display apparatus with a touch detection function 1 scans the entire touch detection surface of the touch detecting device 30 provided to cover the display surface on which display output is performed in a display area 20a. With this configuration, the display apparatus with a touch detection function 1 can detect a position where an external proximate object is in contact with or in proximity to the touch detection surface.

The liquid crystal layer 6 modulates light passing therethrough depending on the state of an electric field. The liquid crystal layer 6, for example, is a liquid crystal display device including liquid crystals driven in a lateral electric-field mode, such as the in-plane switching (IPS) mode including the fringe field switching (FFS) mode. An orientation film may be provided between the liquid crystal layer 6 and the first substrate 2 and between the liquid crystal layer 6 and the second substrate 3 illustrated in FIG. 6.

The second substrate 3 includes a glass substrate 31 and a color filter 32 provided on one surface of the glass substrate 31. The touch detection electrodes TDL serving as the detection electrodes of the touch detecting device 30 are provided on the other surface of the glass substrate 31. A polarization plate 35 is provided on the touch detection electrodes TDL. While the substrates in the first substrate and the second substrate according to the first embodiment are glass substrates, the present embodiment is not limited thereto. The substrates in the first substrate and the second substrate may be film substrates, for example.

The color filter 32 illustrated in FIG. 6 has color areas colored with three colors of red (R), green (G), and blue (B), for example, and cyclically arranged. Color areas 32R, 32G, and 32B (refer to FIG. 7) colored with the three colors of R, G, and B are associated with the corresponding sub-pixels SPix illustrated in FIG. 7. A group of the color areas 32R, 32G, and 32B constitutes one pixel Pix. The pixels Pix are arranged in a matrix in the direction parallel to the scanning lines GCL and the direction parallel to the signal lines SGL to serve as the display area 20a.

The color filter 32 faces the liquid crystal layer 6 in the direction perpendicular to the glass substrate 21. Each sub-pixel SPix can display a single color. The liquid crystal display device 20 performs display output using the pixels Pix composed of the sub-pixels SPix colored with different colors by the color filter 32, thereby displaying an image. In other words, the liquid crystal display device 20 includes the pixels Pix that display an image. The color filter 32 may have another combination of colors as long as they are different colors. The number of types of colors is not limited to three and may be four or more. The color filter 32 may include an area with no color or an area with no color filter 32. In other words, a sub-pixel SPix not colored with the color filter 32 may be provided.

Figure 9:
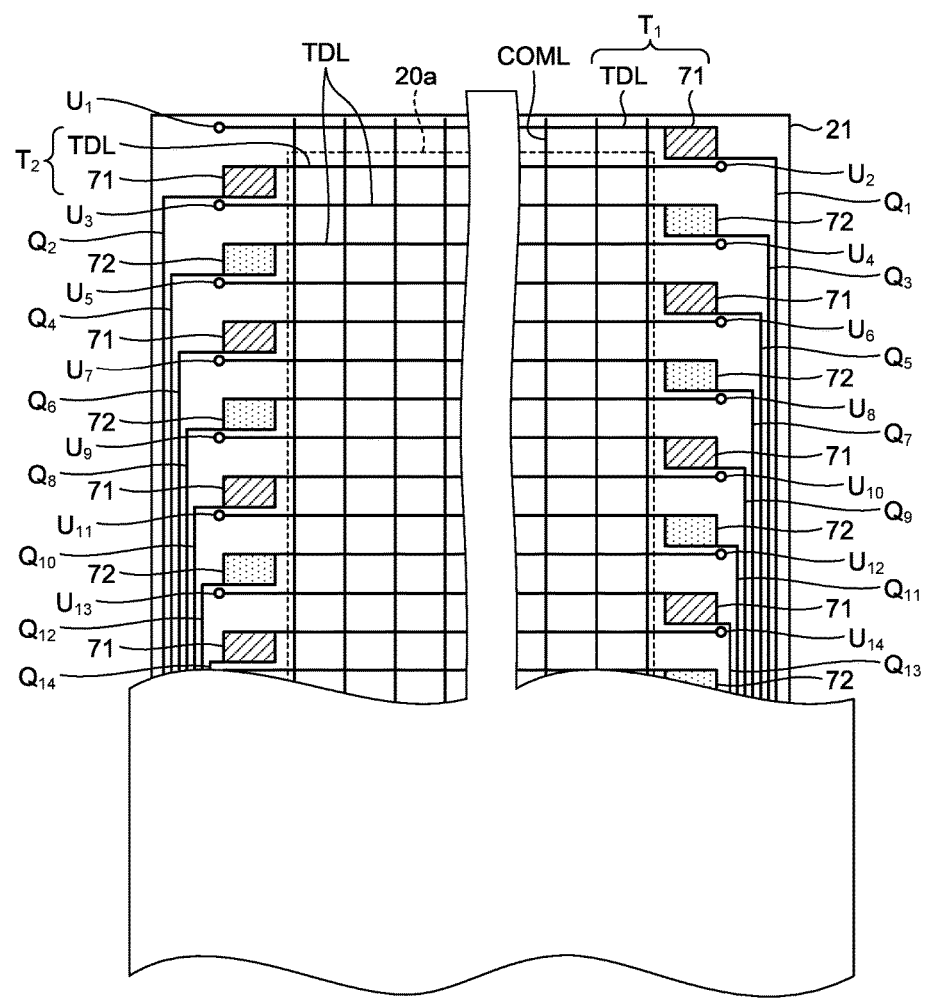
FIG. 9 is a schematic wiring diagram of exemplary arrangement of force detectors provided in the display apparatus with a touch detection function.

The following describes a configuration that performs force detection and a mechanism of the force detection. FIG. 9 is a schematic wiring diagram of exemplary arrangement of the force detectors 71 and 72 provided in the display apparatus with a touch detection function 1. The display apparatus with a touch detection function 1 includes the force detectors 71 and 72. Specifically, as illustrated in FIG. 9, for example, the force detectors 71 and 72 are provided at ends of the touch detection electrodes TDL and on opposite sides of the display area 20a. More specifically, the force detectors 71 and 72 are provided outside the display area 20a as components connected to wiring that couples the corresponding touch detection electrodes TDL to the touch detector 40 (refer to FIG. 5). Thus, the force detectors 71 and 72 are integrated with the corresponding touch detection electrodes TDL and the corresponding wiring. In FIG. 9 and other figures, U denotes an electrical coupling end on the side provided with the touch detection electrode TDL with respect to the force detectors 71 and 72. In FIG. 9 and other figures, Q denotes a coupling line on the side not provided with the touch detection electrode TDL with respect to the force detectors 71 and 72. In FIG. 9 and other figures, U and Q each have a subscript. One combination of the force detector (force detector 71 or 72) and the touch detection electrode TDL coupled to the coupling end U and the coupling line Q having the same subscript serves as one configuration. In FIG. 9 and other figures, T denotes the configuration including the force detector (force detector 71 or 72) and the touch detection electrode TDL provided between the coupling end U and the coupling line Q. T has the same subscript as those of the coupling end U and the coupling line Q. FIG. 9 illustrates a plurality of coupling ends $U_1, U_2, \ldots, U_{14}$, a plurality of coupling lines $Q_1, Q_2, \ldots, Q_{14}$, and configurations $T_1$ and $T_2$. These reference numerals do not indicate the specific number of the force detectors (force detector 71 or 72) and the specific number of the touch detection electrodes TDL. The force detector 72 and the touch detection electrode TDL provided between the coupling end $U_3$ and the coupling line $Q_3$, for example, are assumed to be a configuration $T_3$, which is not illustrated. This rule is also applied to the configuration (T) provided between the coupling end U and the coupling line Q having a subscript of 4 or larger. The coupling ends $U_1, U_2, \ldots$ may be referred to as the coupling end U when they need not particularly be distinguished from one another. The coupling lines $Q_1, Q_2, \ldots$ may be referred to as the coupling line Q when they need not particularly be distinguished from one another. The configurations $T_1, T_2, \ldots$ may be referred to as the configuration T when they need not particularly be distinguished from one another.

Figure 10:
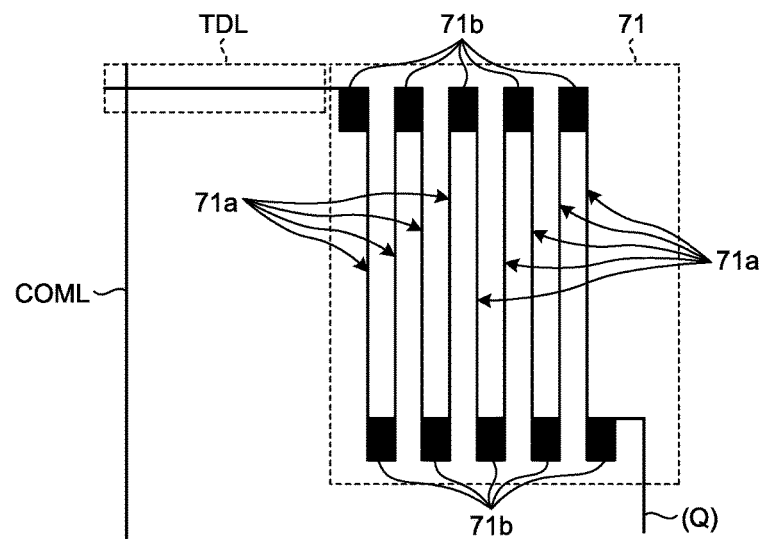
FIG. 10 is a diagram of an example of a specific configuration of the force detector and a portion near the force detector.
Figure 11:
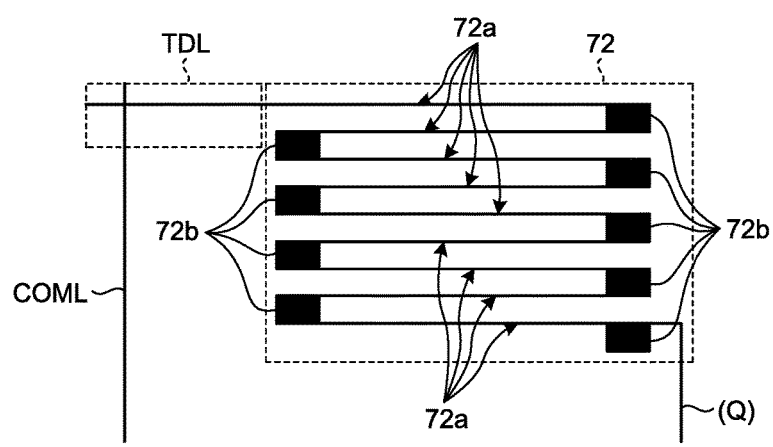
FIG. 11 is a diagram of an example of a specific configuration of the force detector and a portion near the force detector.

FIG. 10 is a diagram of an example of a specific configuration of the force detector 71 and a portion near the force detector 71. FIG. 11 is a diagram of an example of a specific configuration of the force detector 72 and a portion near the force detector 72. The force detector 71 has strain detection patterns 71a and folded patterns 71b. The force detector 72 has strain detection patterns 72a and folded patterns 72b. The strain detection patterns 71a are a plurality of wiring patterns extending in parallel with a detection direction. The folded patterns 71b are wiring patterns that couple strain detection patterns 71a adjacent to each other in an intersection direction orthogonal to the detection direction and along the plate surface of the display apparatus with a touch detection function 1. The strain detection patterns 72a are a plurality of wiring patterns extending in parallel with a detection direction. The folded patterns 72b are wiring patterns that couple strain detection patterns 72a adjacent to each other in an intersection direction orthogonal to the detection direction and along the plate surface of the display apparatus with a touch detection function 1. The extending direction of the strain detection patterns 71a is different from the extending direction of the strain detection patterns 72a. Two folded patterns 71b couple a strain detection pattern 71a with two strain detection patterns 71a adjacent to the strain detection pattern 71a in a manner sandwiching it therebetween. The positions of the two folded patterns 71b are opposite to each other. That is, the strain detection pattern 71a is coupled to one of the two strain detection patterns 71a by one folded pattern 71b positioned at a first end in the detection direction. The strain detection pattern 71a is also coupled to the other of the two strain detection patterns 71a by another folded pattern 71b positioned at a second end in the detection direction. In other words, the folded patterns 71b include a first folded pattern 71b and a second folded pattern 71b. The first folded pattern 71b is arranged on the first end in the detection direction, and the second folded pattern 71b is arranged on the second end in the detection direction. The first folded pattern 71b and the second folded pattern 71b are arranged alternately in the intersection direction orthogonal to the detection direction. Assuming that three strain detection patterns 71a arranged consecutively are denoted by a first strain detection pattern 71a, a second strain detection pattern 71a, and a third strain detection pattern 71a. The second strain detection pattern 71a between the first and the third strain detection patterns 71a is coupled to the first strain detection pattern 71a by the first folded pattern 71b. The second strain detection pattern 71a is coupled to the third strain detection pattern 71a by the second folded pattern 71b. The strain detection patterns 72a and folded patterns 72b of the force detector 72 are arranged in the similar manner to the strain detection patterns 71a and folded patterns 71b of the force detector 71. With the strain detection patterns 71a and 72a and the folded patterns 71b and 72b having the coupling relation described above, each of the force detectors 71 and 72 is provided as a wiring pattern including the strain detection patterns extending in the detection direction and consecutively aligned in the intersection direction.

The force detectors 71 and 72 each serve as a strain gauge that detects a strain in the display apparatus with a touch detection function 1. Specifically, when force applied by a touch operation generates a strain in the plate surface of the display apparatus with a touch detection function 1, the force detectors 71 and 72 detect the strain. The degree of the strain varies depending on the force applied by the touch operation. The force detectors 71 and 72 detect a strain in the display apparatus with a touch detection function 1, thereby detecting force applied to the display apparatus with a touch detection function 1 by a touch operation. More specifically, the electrical resistance value of the force detectors 71 and 72 changes depending on the degree of the strain. Consequently, the display apparatus with a touch detection function 1 can detect force (force applied by a touch operation), which generates a strain in the display apparatus with a touch detection function 1, based on a change in the electrical resistance value of the force detectors 71 and 72. In the following description, a term "force detection" indicates detection of presence of force (force applied by a touch detection) that generates a strain in the display apparatus with a touch detection function 1 and detection of the magnitude of force using the force detectors 71 and 72. As described above, the display apparatus with a touch detection function 1 includes the strain gauges (e.g., the force detectors 71 and 72), each of which is integrated with a corresponding one of the touch detection electrodes (e.g., the touch detection electrodes TDL) provided along the touch detection surface.

The force detectors 71 and 72 mainly detect a strain generated in the detection direction. The detection direction of the force detector 71 according to the first embodiment is different from that of the force detector 72. The detection direction of the force detector 71, for example, is the same as the extending direction of the drive electrodes COML. By contrast, the detection direction of the force detector 72 is a direction orthogonal to the extending direction of the drive electrodes COML and along the plate surface of the display apparatus with a touch detection function 1. With a plurality of force detectors 71 and 72, the force distribution (e.g., to which portion larger force is applied) on the touch detection surface can be determined based on the respective strain amounts.

The folded patterns 71b and 72b of the force detectors 71 and 72 have higher rigidity than that of the strain detection patterns 71a and 72a against a strain in the intersection direction. Specifically, the folded patterns 71b and 72b have a rectangular shape. The folded patterns 71b and 72b are provided such that the degree of a change in the electrical resistance of the folded patterns 71b and 72b generated when a strain occurs in the intersection direction is smaller than a change in the electrical resistance of the strain detection patterns 71a and 72a generated when a strain occurs in the detection direction. The shape of the folded patterns 71b and 72b is not limited to a rectangular shape, and the folded patterns 71b and 72b may have another shape capable of reducing the electrical resistance.

The force detectors 71 and the force detectors 72 are alternately arranged. Specifically, as illustrated in FIG. 9, for example, the force detectors 71 and the force detectors 72 are alternately arranged in the extending direction of the drive electrodes COML in areas included in a frame area outside the display area 20a, the longitudinal direction of the areas extending in the extending direction of the drive electrodes COML. In the relation between the touch detection electrodes TDL aligned in the extending direction of the drive electrodes COML and the force detectors 71 and 72, a predetermined number of the force detectors 71 that are consecutively aligned and a predetermined number of the force detectors 72 that are consecutively aligned are alternately arranged with respect to the touch detection electrodes TDL, each of the force detectors 71 and 72 being coupled with a corresponding one of the touch detection electrodes TDL. The predetermined number is two in FIG. 9, for example.

To detect force, there has been developed a method of measuring the electrical resistance value based on an electric current (e.g., the electric current Vi) caused to flow by voltage supplied to the force detectors 71 and 72, for example. The force calculating circuit 102 calculates force based on the measurement of the electrical resistance value. In other words, the touch detector 40 serves as a detector that detects force based on the electrical resistance in the touch detection electrodes (e.g., the touch detection electrodes TDL) each of which is integrated with a corresponding one of the strain gauges (e.g., the force detectors 71 and 72).

Figure 12:
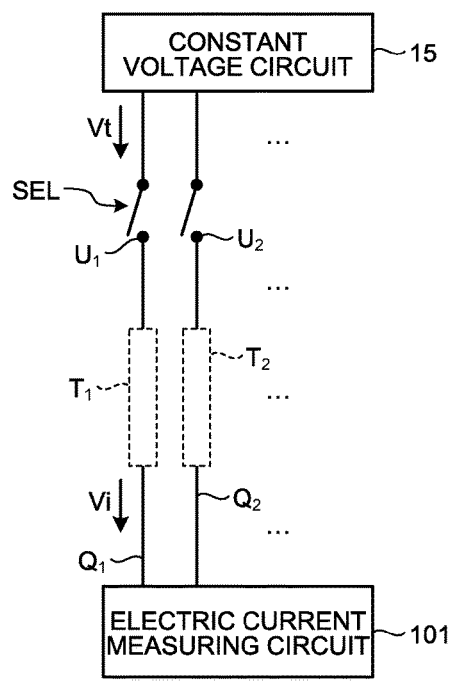
FIG. 12 is a block diagram of an example of a functional configuration of a circuit that detects force.

FIG. 12 is a block diagram of an example of a functional configuration of a circuit that detects force. As illustrated in FIG. 12, the coupling ends $U_1$, $U_2$, . . . are coupled to the constant voltage circuit 15 via a selector switch circuit SEL. The selector switch circuit SEL is a switching circuit that selectively couples the coupling ends $U_1$, $U_2$, . . . to the constant voltage circuit 15. The selector switch circuit SEL may be provided as part of the constant voltage circuit 15 or may be an independent circuit that operates under the control of the controller 11.

The constant voltage circuit 15 supplies constant voltage Vt to one configuration T (e.g., one of the configurations $T_1$, $T_2$, . . . ) coupled thereto via the selector switch circuit SEL. The constant voltage circuit 15 applies the voltage from the coupling end U side to which the selector switch circuit SEL is coupled. The coupling end U side coupled with the selector switch circuit SEL is a side on which the touch detection electrode TDL is provided with respect to the force detector (force detector 71 or 72). While the voltage is applied to a configuration T from one end (coupling end U) thereof in FIGS. 9 and 12 and other figures, the voltage may be applied to a configuration T from both ends (e.g., the coupling end U and the coupling line Q) thereof. The configuration T generates the electric current Vi in relation to the constant voltage Vt and outputs it to the electric current measuring circuit 101. The electric current measuring circuit 101 measures the voltage value of the electric current Vi and transmits an output indicating the measurement result to the force calculating circuit 102. The configuration T includes the force detector (force detector 71 or 72), and the electric resistance value changes depending on a strain generated by force applied to the touch detection surface. In other words, the magnitude of the voltage value of the electric current Vi varies depending on the presence or absence of force and the magnitude of force when the force is present. Based on the value of the electric current Vi measured by the electric current measuring circuit 101, the force calculating circuit 102 calculates force detected at the position of the force detector (force detector 71 or 72) included in the configuration T.

The selector switch circuit SEL performs a switching operation at regular time intervals, such that configuration T to which the constant voltage Vt is supplied is shifted one by one. The selector switch circuit SEL, for example, may scan the configurations T in order of the subscript or another order. The configurations T each generate the electric current Vi in relation to the constant voltage Vt and output it to the electric current measuring circuit 101. The electric current measuring circuit 101 individually measures the voltage values of the electric currents Vi from the corresponding configurations T and transmits outputs each of which indicates the measurement result on a corresponding one of the configurations T to the force calculating circuit 102. The force calculating circuit 102 calculates the distribution of force applied to the display apparatus with a touch detection function 1 by a touch operation, based on the force indicated by the voltage value of the electric current Vi that is output from each of the configurations T and on the previously stored information on the positional relation between the force detectors (e.g., the force detectors 71 and 72) integrated with the corresponding touch detection electrodes TDL. In a case where the calculation of the force distribution is performed, the following two timings are set to be different from each other: the timing of touch detection performed by the touch detection electrodes TDL that perform capacitive touch detection, and the timing of supplying voltage for force detection to the force detectors 71 and 72.

In the first embodiment, the drive electrodes COML are used for both display drive and touch detection. Thus, the timing of display drive is set to be different from the timing of touch detection. While those timings are controlled by the detection timing controller 46 under the control of the controller 11, a dedicated component that controls the timings may be provided.

Figure 13:
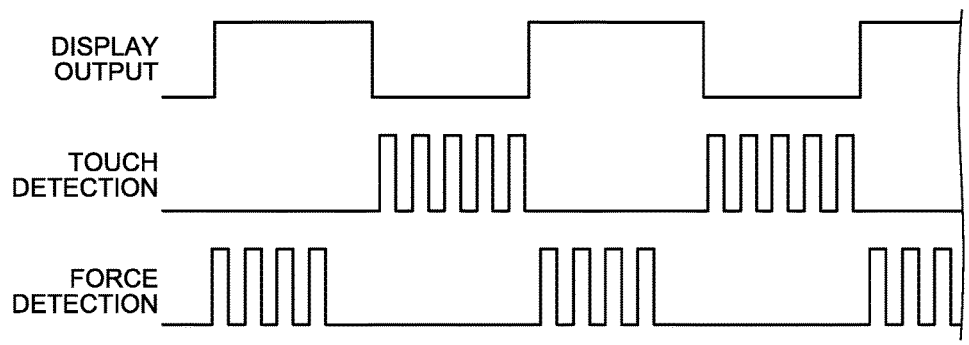
FIG. 13 is a timing chart schematically illustrating the relation between a display drive timing, a touch detection timing, and a force detection timing in the display apparatus with a touch detection function.

FIG. 13 is a timing chart schematically illustrating the relation between a display drive timing, a touch detection timing, and a force detection timing in the display apparatus with a touch detection function 1. As described above, the timing of display drive is different from the timing of touch detection. The display apparatus with a touch detection function 1 of the first embodiment employs an intermittent driving method in which display drive and touch detection are alternately performed. As described above, the timing of touch detection is different from the timing of force detection. By contrast, the timing of display drive need not be different from the timing of force detection. Thus, in the first embodiment, display drive and force detection are performed at the same time. Specifically, at the timing of display drive, the constant voltage circuit 15 supplies voltage to the touch detection electrodes TDL and the force detectors 71 and 72. By contrast, at the timing of touch detection, the drive electrode COML and the touch detection electrode TDL form capacitance in the capacitance element C used for touch detection according to the drive signal Vcom supplied to the drive electrode COML.

In the electrodes of the display apparatus with a touch detection function 1, that is, in the drive electrodes COML, the touch detection electrodes TDL, the force detectors 71 and 72, and other electrodes, the electrical resistance changes depending on temperature. By considering the relation between the electrodes and the temperature, touch detection and force detection can be performed more accurately. The display apparatus with a touch detection function 1 may include a temperature detector, for example. In this case, the signal processor 44 or another component may perform correction based on the temperature detected by the temperature detector in the arithmetic operation thereof.

Figure 14:
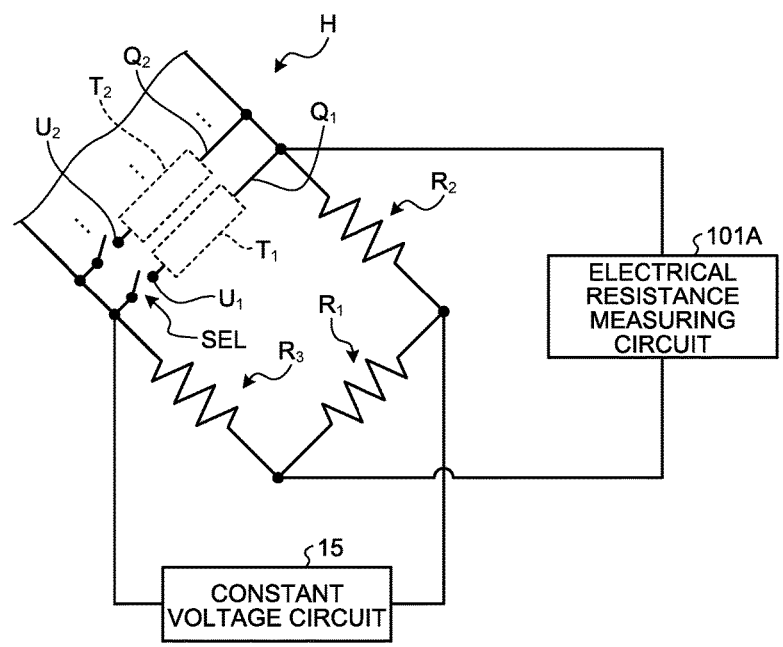
FIG. 14 is a block diagram of another example of the functional configuration of the circuit that detects force.

The circuit configuration that detects force using the force detectors 71 and 72 may be appropriately changed. FIG. 14 is a block diagram of another example of a functional configuration of the circuit that detects force. As illustrated in FIG. 14, the circuit configuration related to force detection may have a configuration in which the configuration T including the force detector (force detector 71 or 72) is used as one electrical resistor the resistance value of which is unknown among four electrical resistors included in a Wheatstone bridge H. Specifically, the Wheatstone bridge H includes electrical resistors $R_1$, $R_2$, and $R_3$ and a plurality of configurations T. The resistance values of the electrical resistors $R_1$, $R_2$, and $R_3$ are known. The configurations T are selectively coupled to the other electrical resistors included in the Wheatstone bridge H by the selector switch circuit SEL. In other words, the configuration T coupled by the selector switch circuit SEL is used as one electrical resistor, the value of which is unknown, among the four electrical resistors included in the Wheatstone bridge H. More specifically, in the Wheatstone bridge H, the configuration T is coupled to the electrical resistors $R_2$ and $R_3$, for example. The electrical resistance $R_1$ is coupled to the ends of the electrical resistors $R_2$ and $R_3$ in the Wheatstone bridge H, the ends not being coupled to the configuration T.

The Wheatstone bridge H is coupled to the constant voltage circuit 15 and an electrical resistance measuring circuit 101A. The electrical resistance measuring circuit 101A is provided instead of the electric current measuring circuit 101 to measure the electrical resistance value of the Wheatstone bridge H. Specifically, the constant voltage circuit 15 is coupled to the Wheatstone bridge H at two points between the configuration T and the electrical resistor $R_3$ and between the electrical resistor $R_1$ and the electrical resistance $R_2$ to supply the constant voltage. The electrical resistance measuring circuit 101A is coupled to the Wheatstone bridge H at two points between the configuration T and the electrical resistor $R_2$ and between the electrical resistor $R_1$ and the electrical resistor $R_3$ to measure the electrical resistance value. The electrical resistance value measured by the electrical resistance measuring circuit 101A changes depending on a change in the electrical resistance value of the force detector (force detector 71 or 72) of the configuration T. The change in the electrical resistance value of the force detector (force detector 71 or 72) is caused depending on a strain generated by force applied to the touch detection surface. Consequently, the electrical resistance value measured by the electrical resistance measuring circuit 101A indicates the force that generates a strain in the force detector 71 or 72. An output indicating the electrical resistance value measured by the electrical resistance measuring circuit 101A is transmitted to the force calculating circuit 102. Based on the force indicated by the electrical resistance value and on the previously stored information on the positional relation between the force detectors (e.g., the force detectors 71 and 72) integrated with the corresponding touch detection electrodes TDL, the force calculating circuit 102 calculates the distribution of force applied to the display apparatus with a touch detection function 1 by a touch operation.

While the configurations T share one Wheatstone bridge H using the selector switch circuit SEL in FIG. 14, each of the configurations T may be individually provided with a corresponding one of Wheatstone bridges H.

Figure 15:
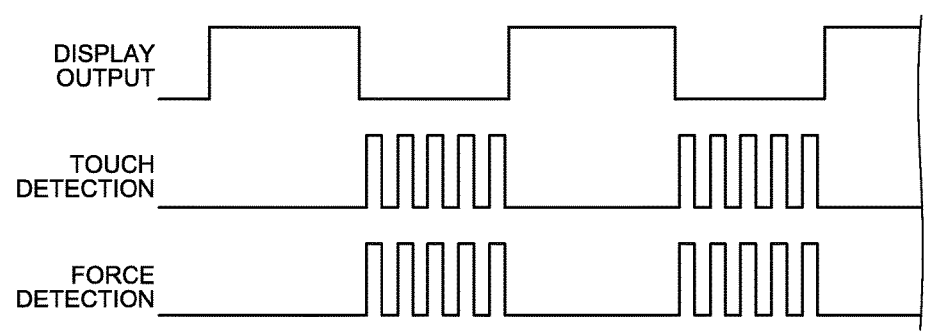
FIG. 15 is a timing chart schematically illustrating the relation between the display drive timing, the touch detection timing, and the force detection timing in a case where touch detection and force detection are performed in parallel in the same period.

FIG. 15 is a timing chart schematically illustrating the relation between the display drive timing, the touch detection timing, and the force detection timing in a case where touch detection and force detection are performed in parallel in the same period. In the description with reference to FIG. 13, the timing of touch detection performed by the touch detection electrodes TDL that perform capacitive touch detection is different from the timing of supplying voltage for force detection to the force detectors 71 and 72. Alternatively, these timings may be the same timing. In other words, touch detection and force detection may be performed in parallel in the same period.

Figure 16:
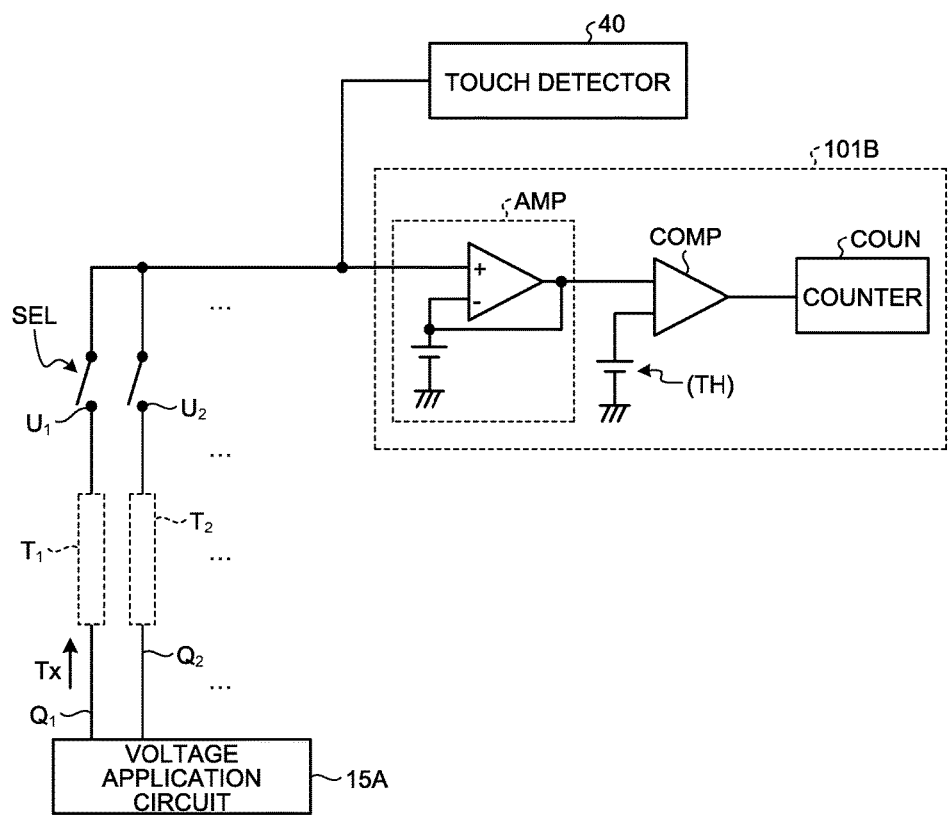
FIG. 16 is a block diagram of an example of a functional configuration of the circuit that detects force in a case where touch detection and force detection are performed in parallel in the same period.

FIG. 16 is a block diagram of an example of a functional configuration of the circuit that detects force in a case where touch detection and force detection are performed in parallel in the same period. In the example illustrated in FIG. 16, a voltage application circuit 15A is provided instead of the constant voltage circuit 15. The voltage application circuit 15A outputs pulses (square wave) from the coupling line Q side to the configuration T, thereby applying voltage. An output (touch detection signal Vdet) from the configuration T to which the voltage is applied is received by the touch detector 40 and a difference detector 101B coupled to the configuration T via the selector switch circuit SEL. The difference detector 101B includes an amplifier AMP, a comparator COMP, and a counter COUN, for example. The amplifier AMP amplifies the output from the configuration T. The comparator COMP outputs a signal corresponding to a result of comparison between the output from the amplifier and reference voltage TH (refer to FIG. 17) serving as a threshold. The counter COUN counts the period in which the signal is output from the comparator COMP.

Figure 17:
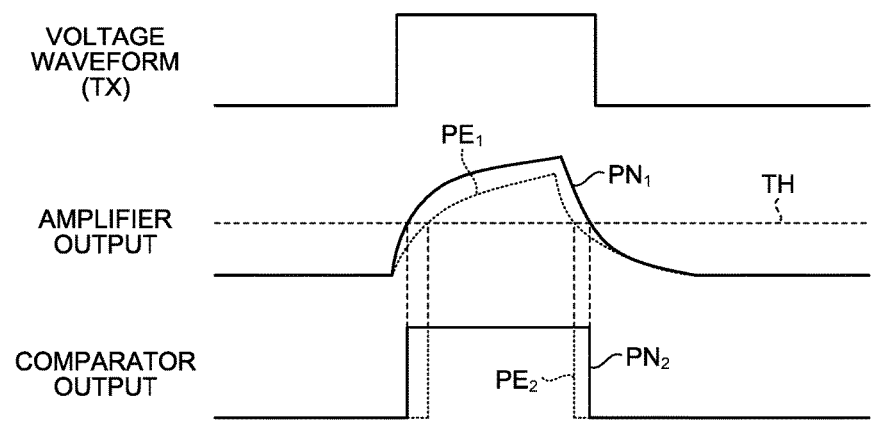
FIG. 17 is a diagram of an example of the relation between a voltage waveform of a pulse that is output from a voltage application circuit, an output from an amplifier, and an output from a comparator in relation to the output from the amplifier.

FIG. 17 is a diagram of an example of the relation between a voltage waveform of a pulse that is output from the voltage application circuit 15A, an output from the amplifier AMP, and an output from the comparator COMP depending on the output from the amplifier AMP. An output from the configuration T generated in response to the pulses from the voltage application circuit 15A is amplified by the amplifier AMP and compared with the reference voltage TH by the comparator COMP. The output from the configuration T varies depending on whether a strain is generated by force in the force detector (force detector 71 or 72). Specifically, an output $PE_1$ obtained when a strain is generated by force has a larger time constant in rise and fall of the output than that of an output $PN_1$ obtained when no strain is generated. This is because, when a strain is generated by force in the force detector (force detector 71 or 72), the electrical resistance in the force detector increases. As a result, in the relation with respect to the reference voltage TH, the output $PE_1$ obtained when a strain is generated by force is different from the output $PN_1$ obtained when no strain is generated as follows: the output $PE_1$ exceeds the reference voltage TH at a timing later than that of the output $PN_1$ and falls below the reference voltage TH at a timing earlier than that of the output $PN_1$, for example. Consequently, an output $PE_2$ that is output from the comparator COMP when a strain is generated by force is different in the output pattern from an output $PN_2$ that is output when no strain is generated as follows: the output $PE_2$ starts at a timing later than that of the output $PN_2$ and ends at a timing earlier than that of the output $PN_2$, for example. The difference detector 101B outputs a result of counting performed by the counter COUN to the force calculating circuit 102. Based on the result of force detection indicated by the count result and on the previously stored information on the positional relation between the force detectors (e.g., the force detectors 71 and 72) integrated with the corresponding touch detection electrodes TDL, the force calculating circuit 102 calculates the distribution of force applied to the display apparatus with a touch detection function 1 by a touch operation. In the configuration illustrated in FIG. 17, the touch detector 40 may perform touch determination using the output from the amplifier AMP or the output from the comparator COMP.

As described above, the display apparatus with a touch detection function 1 of the first embodiment includes the strain gauge (e.g., the force detector 71 or 72) integrated with the touch detection electrode (e.g., the touch detection electrode TDL) provided along the touch detection surface. As a result, the configuration that performs touch detection can be integrated with the configuration that performs force detection. Consequently, the first embodiment can detect force with a configuration integrated with a component used for another configuration (configuration related to touch detection).

The display apparatus with a touch detection function 1 of the first embodiment detects force based on the electrical resistance in the touch detection electrode integrated with the strain gauge. Consequently, the first embodiment can secure the accuracy of force detection.

Second Embodiment

The following describes an embodiment (second embodiment) part of the configuration of which is different from that of the first embodiment with reference to FIGS. 18 to 23. In the description of the second embodiment, components similar to those of the first embodiment are denoted by the same reference numerals, and explanation thereof may be omitted.

Figure 18:
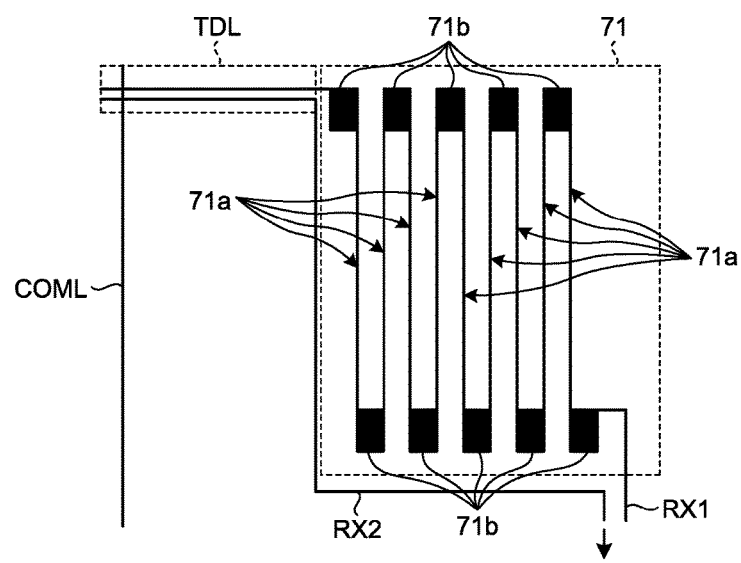
FIG. 18 is a diagram of an example of a configuration of the force detector and a portion near the force detector according to a second embodiment.
Figure 19:
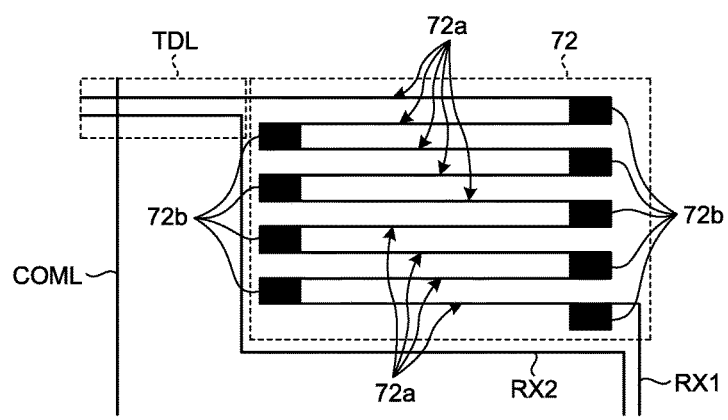
FIG. 19 is a diagram of an example of a specific configuration of the force detector and a portion near the force detector according to the second embodiment.

FIG. 18 is a diagram of an example of a configuration of the force detector 71 and a portion near the force detector 71 according to the second embodiment. FIG. 19 is a diagram of an example of a specific configuration of the force detector 72 and a portion near the force detector 72 according to the second embodiment. While the touch detection electrodes TDL are each schematically represented by one solid line in FIG. 9, the touch detection electrodes TDL according to the second embodiment each have two electrical systems. In the description of the two electrical systems, one of the two electrical systems may be referred to as a "first system RX1", whereas the other thereof may be referred to as a "second system RX2". The specific arrangement of the force detectors 71 and 72 according to the second embodiment is the same as that illustrated in FIG. 9, for example. The various methods for detecting force described with reference to FIGS. 12 to 17 are also applicable to the second embodiment.

As illustrated in FIGS. 18 and 19, the first system RX1 has the same structure as that of the touch detection electrode TDL according to the first embodiment. In other words, each of the force detectors 71 and 72 according to the second embodiment is provided outside the display area 20a as a component connected to wiring that couples the touch detection electrode TDL of the first system RX1 to the touch detector 40 (refer to FIG. 5). Each of the force detectors 71 and 72 is integrated with the touch detection electrode TDL of the first system RX1 and the wiring. The second system RX2 does not have the force detector 71 or the force detector 72. Specifically, as illustrated in FIGS. 18 and 19, wiring that couples the touch detection electrode TDL of the second system RX2 to the touch detector 40 (refer to FIG. 5) is an L-shaped wiring pattern rimming the area provided with the force detectors 71 and 72. Thus, in the second embodiment, both the touch detection electrode (first system RX1) integrated with the strain gauge and the touch detection electrode (second system RX2) not provided with the strain gauge are arranged.

Figure 20:
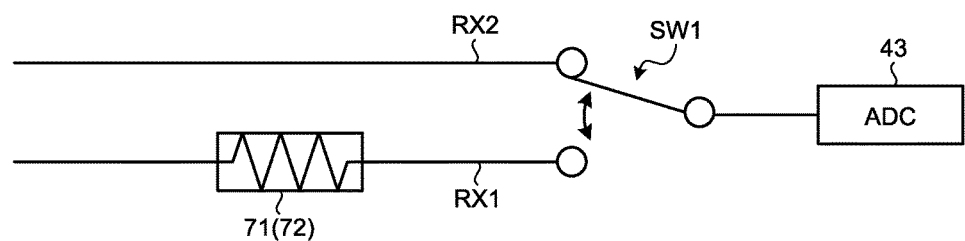
FIG. 20 is a diagram schematically illustrating an exemplary configuration that selectively operates two systems.

FIG. 20 is a diagram schematically illustrating an exemplary configuration that selectively operates the two systems. FIG. 20 and other figures do not illustrate the amplifier 42. The first system RX1 and the second system RX2 according to the second embodiment can share the ADC 43. Specifically, as illustrated in FIG. 20, for example, a switch SW1 may be provided on a coupling path between the ADC 43 and the first and second systems RX1 and RX2. The switch SW1 can switch between a first mode in which the ADC 43 is coupled to the first system RX1 and a second mode in which the ADC 43 is coupled to the second system RX2. The switch SW1 switches the coupling mode of the ADC 43 between the first mode and the second mode at a switching timing controlled by the detection timing controller 46, for example.

The display apparatus with a touch detection function 1 of the second embodiment uses both the first system RX1 and the second system RX2, thereby performing touch detection and force detection in parallel. Specifically, the display apparatus with a touch detection function 1 of the second embodiment uses the output from the second system RX2 not having the force detector 71 or the force detector 72 as standards (reference). The display apparatus with a touch detection function 1 of the second embodiment can perform force detection based on the relation between the output from the second system RX2 and the output from the first system RX1 that can change depending on the presence of force.

Figure 21:
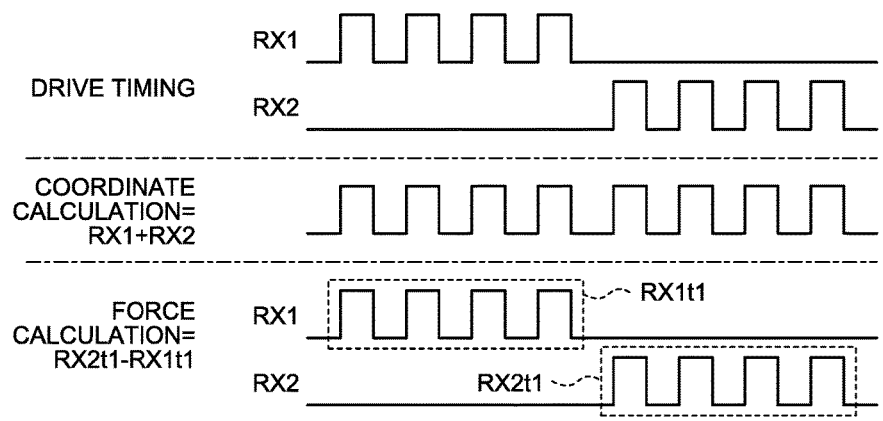
FIG. 21 is a diagram schematically illustrating the relation between drive timings of the two systems, coordinate calculation based on the results of touch detection performed by the two systems, and force calculation based on the results of touch detection performed by the two systems.

FIG. 21 is a diagram schematically illustrating the relation between drive timings of the two systems, coordinate calculation based on the results of touch detection performed by the two systems, and force calculation based on the results of touch detection performed by the two systems. As illustrated in the top figure in FIG. 21, the first system RX1 and the second system RX2 are driven at different timings. A timing at which the first system RX1 of the touch detection electrode TDL forms capacitance C3 with the drive electrode COML and outputs the touch detection signal Vdet is different from a timing at which the second system RX2 of the touch detection electrode TDL forms capacitance C3 and outputs the touch detection signal Vdet.

Both the touch detection signals Vdet that are output from the first system RX1 and the second system RX2 can be used for touch detection. The exclusive use of the first system RX1 and the second system RX2 does not reduce the touch detection period. A period (RX1+RX2) in which one of the first system RX1 and the second system RX2 can form the capacitance C3 with the drive electrodes COML serve as the touch detection period.

Figure 22:
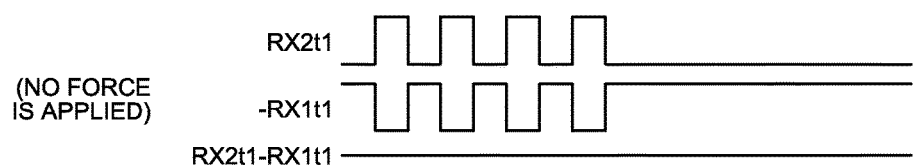
FIG. 22 is a diagram schematically illustrating an example of difference between an output from a second system and an output from a first system obtained when no force is applied.
Figure 23:
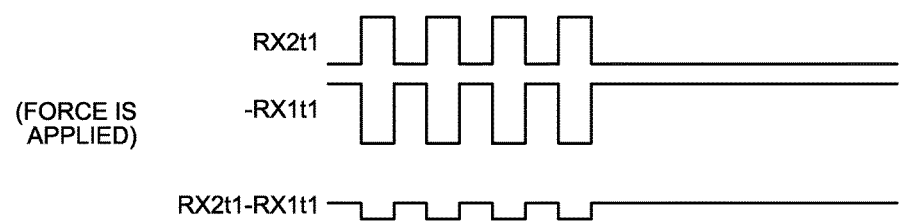
FIG. 23 is a diagram schematically illustrating an example of difference between an output from the second system and an output from the first system obtained when force is applied.
Figure 24:
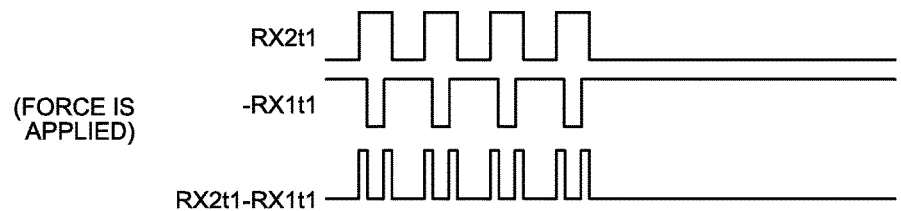
FIG. 24 is a diagram schematically illustrating another example of difference between an output from the second system and an output from the first system obtained when force is applied.

FIG. 22 is a diagram schematically illustrating an example of difference between an output from the second system RX2 and an output from the first system RX1 obtained when no force is applied. FIGS. 23 and 24 are diagrams schematically illustrating an example of difference between the output from the second system RX2 and the output from the first system RX1 obtained when force is applied. Force can be calculated based on the difference (RX2$t$1−RX1$t$1) between the output from the second system RX2 and the output from the first system RX1. As illustrated in FIGS. 9, 18, and 19, the first system RX1 and the second system RX2 of the touch detection electrodes TDL are arranged at substantially the same position and perform touch detection at substantially the same position. When no force is applied by a touch operation, the touch detection signal Vdet of the first system RX1 is substantially the same as the touch detection signal Vdet of the second system RX2. If the touch detection period is the same, synthesized an output obtained by synthesizing an output pattern (RX2$t$1) of the touch detection signal Vdet that is output from the second system RX2 from the start timing to the end timing of touch detection and an inverted output pattern (−RX1$t$1) of the touch detection signal Vdet that is output from the first system RX1 from the start timing to the end timing of touch detection cancels out the outputs as illustrated in FIG. 22. In other words, if the synthesized output indicating the difference (RX2$t$1−RX1$t$1) between the output from the second system RX2 and the output from the first system RX1 is substantially 0 or equivalent to 0, it is determined that no force is applied by a touch operation as a result of force detection. By contrast, when force is applied by a touch operation, a strain is generated in the force detectors 71 and 72. In this case, the electrical resistance in the first system RX1 increases compared with the case where no force is applied. As a result, the inverted output pattern (-RX1t1) of the touch detection signal Vdet that is output from the first system RX1 from the start timing to the end timing of touch detection changes depending on the increase in the electrical resistance. Specifically, as illustrated in FIG. 23, the wave height (resistance value equivalent) of the inverted output pattern (-RX1t1) of the touch detection signal Vdet that is output from the first system RX1 is higher than that of the output pattern (RX2t1) of the touch detection signal Vdet that is output from the second system RX2, for example. Thus, the inverted output pattern (-RX1t1) is different in the wave height (resistance value equivalent) from the output pattern (RX2t1). Let us assume a case where the display apparatus with a touch detection function 1 of the second embodiment uses the output from the comparator COMP described with reference to FIG. 17. In this case, as illustrated in FIG. 24, the rising period in the waveform of the inverted output pattern (-RX1t1) of the touch detection signal Vdet is shorter than that of the output pattern (RX2t1), for example. Thus, the rising period in the waveform of the inverted output pattern (-RX1t1) is different from that of the output pattern (RX2t1). As a result, the synthesized output indicating the difference (RX2t1-RX1t1) between the output from the second system RX2 and the output from the first system RX1 has positive and negative signal changes as illustrated in FIGS. 23 and 24, for example. In other words, if the synthesized output is significantly larger than 0, it is determined that force is applied by a touch operation as a result of force detection. As the applied force increases, the synthesized output increases. Consequently, the magnitude of force can be measured based on the degree of the change in the synthesized output with respect to the synthesized output obtained when no force is applied.

According to the second embodiment, the signal processor 44 calculates force based on the difference between the touch detection signals Vdet that are output from the two systems. Based on the calculated force, the force calculating circuit 102 calculates the distribution of force. In other words, the touch detector 40 according to the second embodiment serves as a detector that detects force based on the difference between the following outputs: the output (touch detection signals Vdet) in touch detection based on the capacitance of the touch detection electrode (touch detection electrode TDL) with which the strain gauge (e.g., the force detector 71 or 72) is integrated, and the output in touch detection based on the capacitance of the touch detection electrode at which the strain gauge is not provided.

As described above, the display apparatus with a touch detection function 1 of the second embodiment can detect force based on the difference between the output (touch detection signals Vdet) in touch detection based on the capacitance of the touch detection electrode (touch detection electrode TDL) with which the strain gauge (e.g., the force detector 71 or 72) is integrated and the output in touch detection based on the capacitance of the touch detection electrode at which the strain gauge is not provided. The display apparatus with a touch detection function 1 of the second embodiment thus can perform force detection simultaneously with touch detection. As a result, the display apparatus with a touch detection function 1 of the second embodiment has no need to supply voltage for force detection to the strain gauge at a timing different from the timing of touch detection or no restrictions on the timings. Consequently, the second embodiment does not require the constant voltage circuit 15, for example.

In the same manner as the second embodiment, the first embodiment can also perform touch detection based on the capacitance. In this case, however, the touch detector 40 needs to store therein in advance information serving as a reference of a case where no force is applied.

First Modification: Modification of the Second Embodiment

Figure 25:
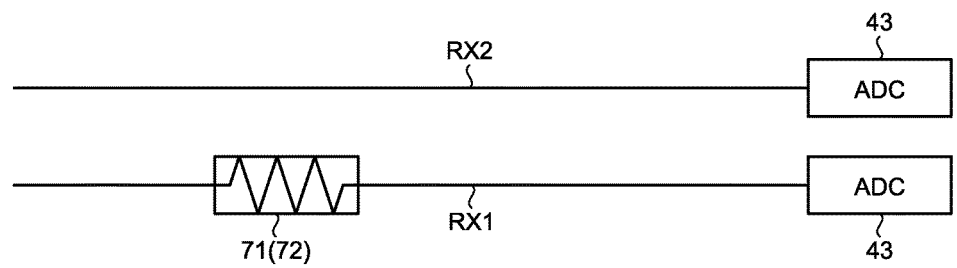
FIG. 25 is a diagram schematically illustrating an exemplary configuration that operates the two systems in parallel.
Figure 26:
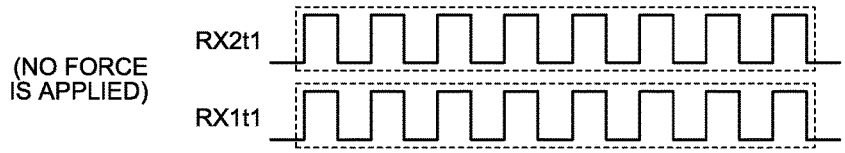
FIG. 26 is a diagram schematically illustrating an example of outputs from the two systems obtained when no force is applied according to a first modification.
Figure 27:
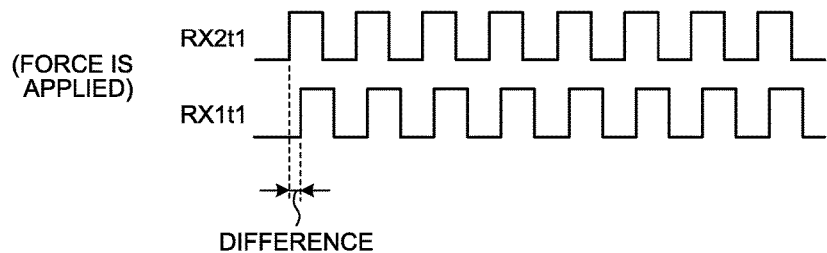
FIG. 27 is a diagram schematically illustrating an example of difference between outputs from the two systems obtained when force is applied according to the first modification.

The following describes a modification (first modification) of the second embodiment with reference to FIGS. 25 to 27. In the description of the first modification, components similar to those of the second embodiment are denoted by the same reference numerals, and explanation thereof may be omitted.

FIG. 25 is a diagram schematically illustrating an exemplary configuration that operates the two systems in parallel. The second embodiment described with reference to FIG. 20 employs the method of switching the two systems by the switch SW1. Alternatively, the two systems may be coupled to corresponding dedicated ADCs 43 as illustrated in FIG. 25.

FIG. 26 is a diagram schematically illustrating an example of outputs from the two systems obtained when no force is applied according to the first modification. FIG. 27 is a diagram schematically illustrating an example of difference between outputs from the two systems obtained when force is applied according to the first modification. The touch detection electrodes TDL according to the first modification are the same as those of the embodiment. Because each of the two systems according to the first modification uses a corresponding one of the dedicated ADCs 43, touch detections of the two systems can be performed at the same time in parallel. As illustrated in FIG. 26, if the output pattern (RX2t1) of the touch detection signal Vdet that is output from the second system RX2 from the start timing to the end timing of touch detection is substantially identical with the output pattern (RX1t1) of the touch detection signal Vdet that is output from the first system RX1 from the start timing to the end timing of touch detection, it is determined that no force is applied by a touch operation. By contrast, when force is applied by a touch operation, difference is detected between the output pattern (RX2t1) of the touch detection signal Vdet that is output from the second system RX2 from the start timing to the end timing of touch detection and the output pattern (RX1t1) of the touch detection signal Vdet that is output from the first system RX1 from the start timing to the end timing of touch detection as illustrated in FIG. 27.

The first modification does not require the switch SW1 according to the second embodiment or need not perform switching control on the switch SW1. The first modification can receive outputs (touch detection signals Vdet) from the two systems simultaneously, and perform force detection more accurately.

Third Embodiment

Figure 28:
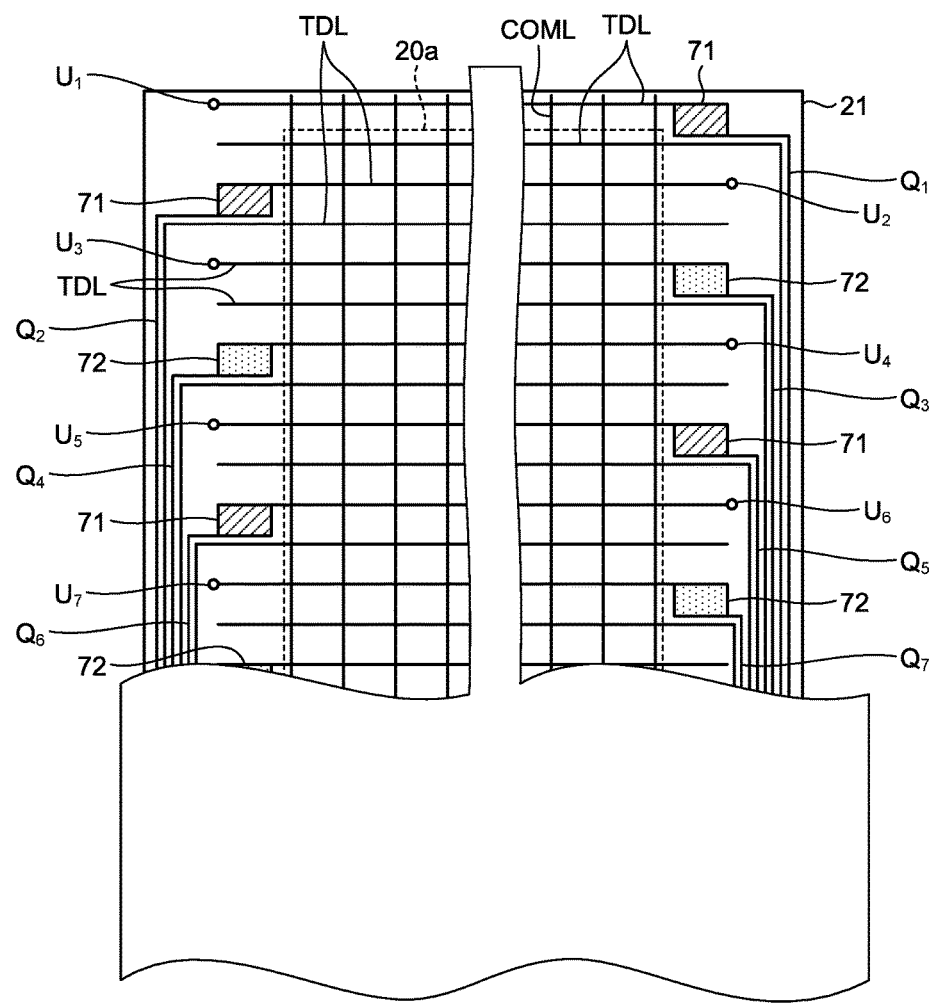
FIG. 28 is a schematic wiring diagram of exemplary arrangement of the force detectors according to a third embodiment.
Figure 29:
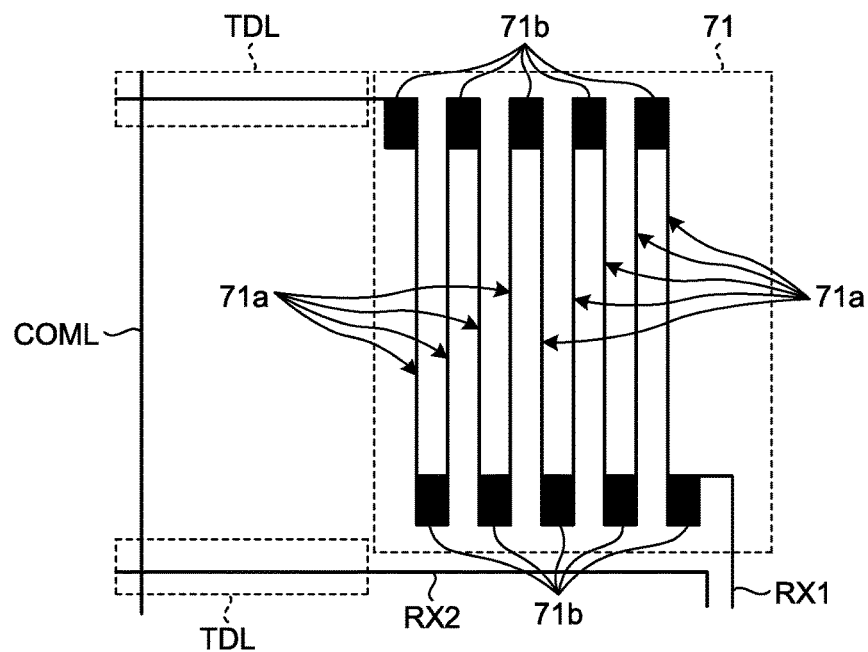
FIG. 29 is a diagram of an example of a configuration of the force detector and a portion near the force detector according to the third embodiment.
Figure 30:
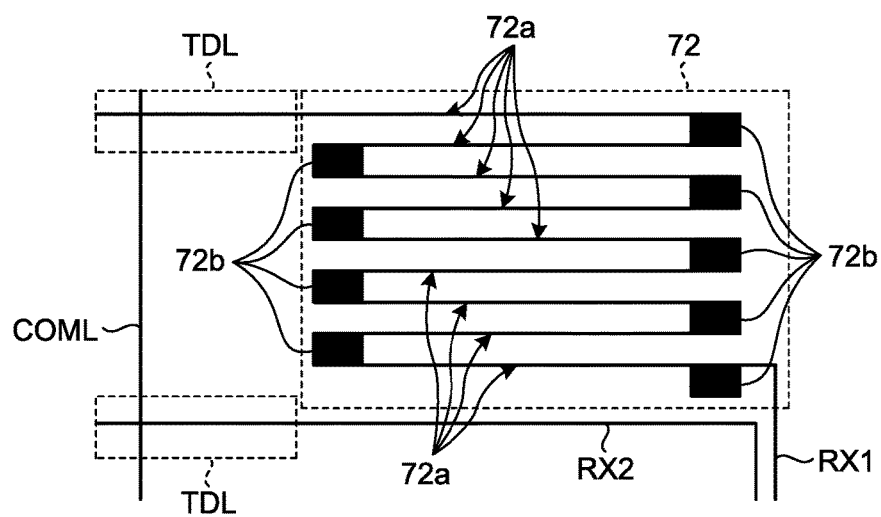
FIG. 30 is a diagram of an example of a specific configuration of the force detector and a portion near the force detector according to the third embodiment.

The following describes an embodiment (third embodiment) part of the configuration of which is different from those of the first and the second embodiments with reference to FIGS. 28 to 30. In the description of the third embodiment, components similar to those of the first and the second embodiments are denoted by the same reference numerals, and explanation thereof may be omitted.

FIG. 28 is a schematic wiring diagram of exemplary arrangement of the force detectors 71 and 72 according to the third embodiment. FIG. 29 is a diagram of an example of a configuration of the force detector 71 and a portion near the force detector 71 according to the third embodiment. FIG. 30 is a diagram of an example of a specific configuration of the force detector 72 and a portion near the force detector 72 according to the third embodiment. The arrangement of the force detectors 71 and 72 according to the second embodiment is the same as that of the force detectors 71 and 72 according to the first embodiment described with reference to FIG. 9. In other words, between each touch detection electrode TDL and the wiring, a corresponding one of the force detectors 71 and 72 is provided according to the second embodiment. Alternatively, some of the touch detection electrodes TDL may not be provided with the force detectors 71 and 72. As illustrated in FIG. 28, for example, a first line and a second line may be alternately arranged in the extending direction of the drive electrodes COML. The first line is provided with one of the force detectors 71 and 72 between the touch detection electrode TDL and the wiring. The second line is not provided with the force detector 71 and the force detector 72 between the touch detection electrode TDL and the wiring. In this case, as illustrated in FIGS. 29 and 30, one first line and one second line adjacent to each other are considered to be a pair. The first line is considered to be the first system RX1, whereas the second line is considered to be the second system RX2. With this configuration, in the third embodiment, touch detection and force detection can be performed in parallel based on the touch detection signals Vdet in the same manner as that of the second embodiment. The interval between the touch detection electrodes TDL of the first line and the second line according to the third embodiment is larger than the interval between the touch detection electrodes TDL of the first system RX1 and the second system RX2 according to the second embodiment. Thus, the display apparatus with a touch detection function 1 of the third embodiment preferably corrects the output considering the interval in force detection or performs adjustment such that the intervals are the same in terms of wiring resistance.

As described above, the third embodiment employs the arrangement of the force detectors 71 and 72 illustrated in FIG. 28. In this case, the third embodiment may employ a force detection method similar to that according to the first embodiment, that is, a method for detecting force by supplying voltage to the touch detection electrodes TDL provided with the force detectors 71 and 72 and measuring the electrical resistance value.

As described above, the third embodiment can provide advantageous effects as those of the first and the second embodiments.

Fourth Embodiment

The following describes an embodiment (fourth embodiment) part of the configuration of which is different from those of the first to the third embodiments with reference to FIGS. 31 to 35. In the description of the fourth embodiment, components similar to those of the first to the third embodiments are denoted by the same reference numerals, and explanation thereof may be omitted.

Figure 31:
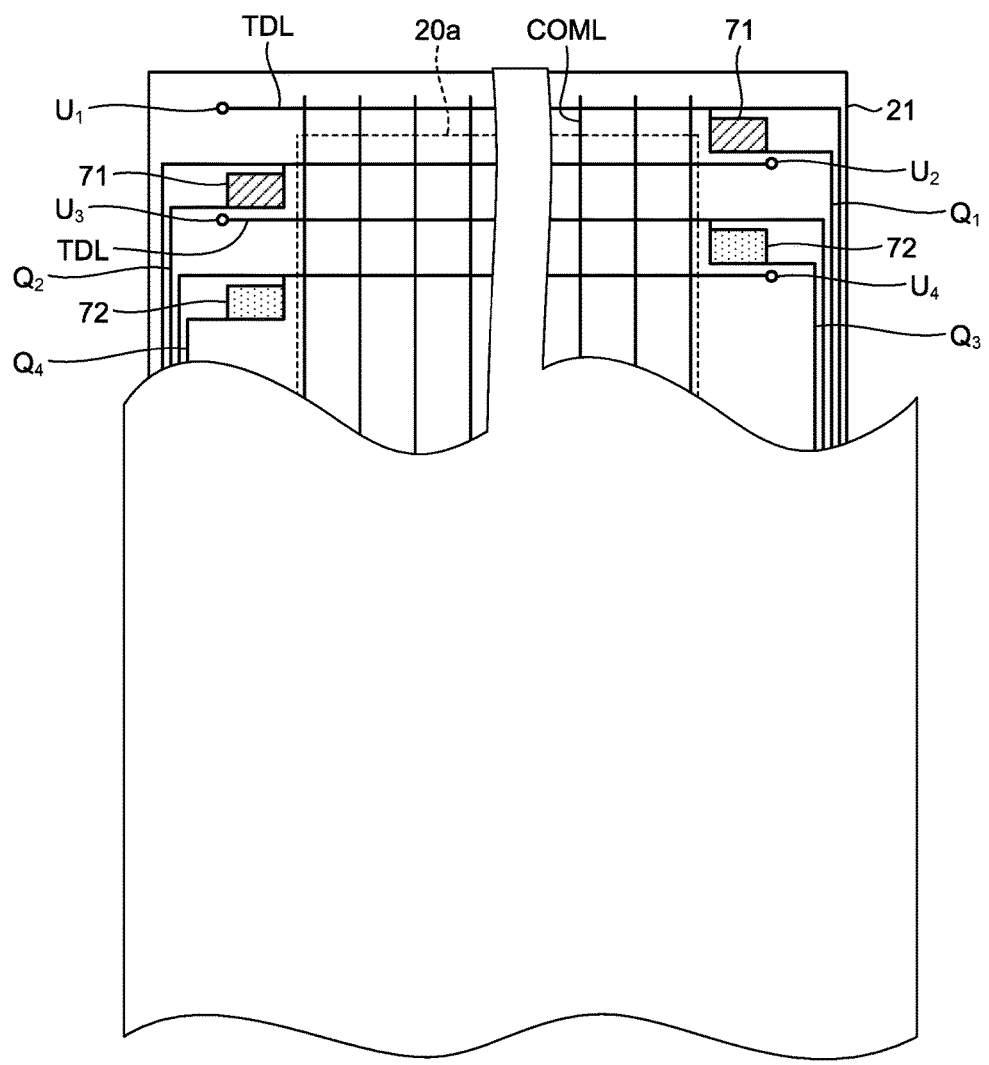
FIG. 31 is a schematic wiring diagram of the relation between the force detectors and the touch detection electrodes according to a fourth embodiment.
Figure 32:
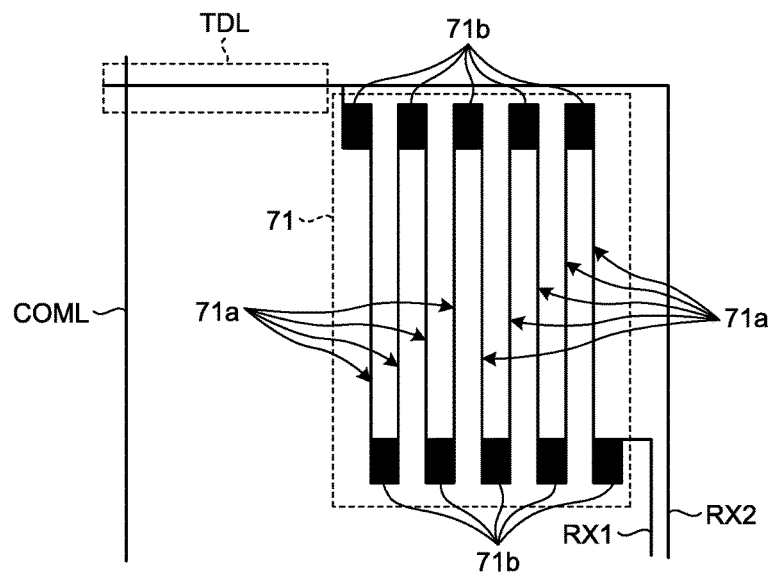
FIG. 32 is a diagram of an example of a configuration of the force detector and a portion near the force detector according to the fourth embodiment.
Figure 33:
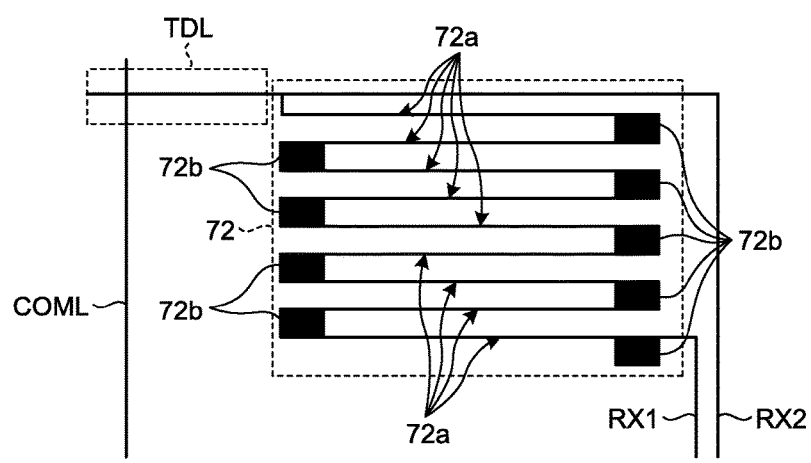
FIG. 33 is a diagram of an example of a specific configuration of the force detector and a portion near the force detector according to the fourth embodiment.

FIG. 31 is a schematic wiring diagram of the relation between the force detectors 71 and 72 and the touch detection electrodes TDL according to the fourth embodiment. FIG. 32 is a diagram of an example of a configuration of the force detector 71 and a portion near the force detector 71 according to the fourth embodiment. FIG. 33 is a diagram of an example of a specific configuration of the force detector 72 and a portion near the force detector 72 according to the fourth embodiment. As illustrated in FIGS. 31 to 33, the wiring that couples the touch detection electrode TDL to the touch detector 40 may have two systems, and a first system RX1 out of the two systems may include the force detectors 71 and 72. In this case, the first system RX1 out of the two systems of the wiring can be considered to be the first system RX1 according to the second embodiment, whereas a second system RX2 out of the two systems of the wiring can be considered to be the second system RX2 according to the second embodiment. The various methods for detecting force described with reference to FIGS. 12 to 17 are also applicable to the fourth embodiment. Specifically, by considering the first system RX1 to be the coupling line Q, for example, the various methods for detecting force can be applied to the fourth embodiment.

Figure 34:
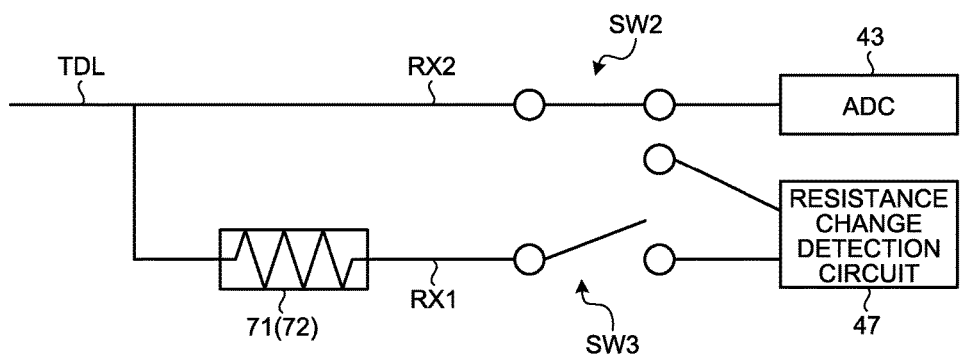
FIG. 34 is a diagram schematically illustrating an exemplary configuration that selectively operates the two systems according to the fourth embodiment.
Figure 35:
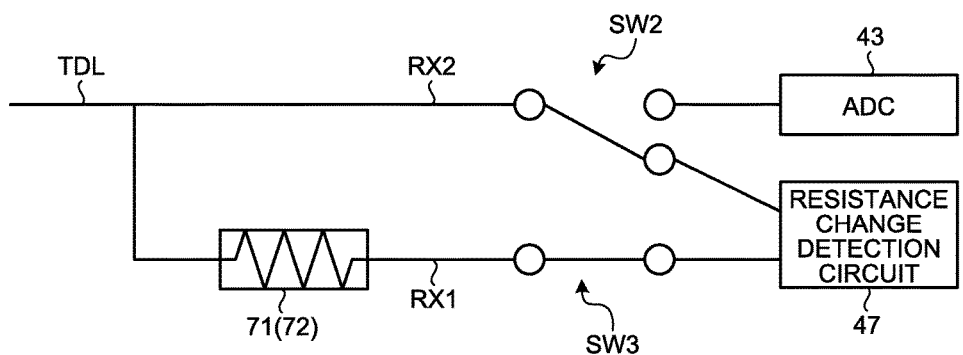
FIG. 35 is another diagram schematically illustrating the exemplary configuration that selectively operates the two systems according to the fourth embodiment.

FIGS. 34 and 35 are diagrams schematically illustrating an exemplary configuration that selectively operates the two systems according to the fourth embodiment. FIG. 34 illustrates a coupling state in touch detection. FIG. 35 illustrates a coupling state in force detection. As illustrated in FIGS. 34 and 35, for example, the fourth embodiment includes a switch SW2 on a coupling path that couples the second system RX2 to the ADC 43 or a resistance change detection circuit 47. The switch SW2 can switch between a first mode in which the second system RX2 is coupled to the ADC 43 and a second mode in which the second system RX2 is coupled to the resistance change detection circuit 47. As illustrated in FIGS. 34 and 35, for example, the fourth embodiment further includes a switch SW3 on a coupling path that couples the first system RX1 to the resistance change detection circuit 47. The switch SW3 can switch between a coupling mode in which the first system RX1 is coupled to the resistance change detection circuit 47 and a decoupling mode in which the first system RX1 is decoupled from the resistance change detection circuit 47. The resistance change detection circuit 47 uses the second system RX2 as standards (reference). The resistance change detection circuit 47 detects a change in the electrical resistance in the first system RX1 that increases depending on force applied by a touch operation, thereby performing force detection. In other words, if the difference in the electrical resistance between the first system RX1 and the second system RX2 is 0 or equivalent to 0, it is determined that no force is applied by a touch operation as a result of force detection. By contrast, if the difference in the electrical resistance between the first system RX1 and the second system RX2 is significantly larger than 0, it is determined that force corresponding to the magnitude of the difference is applied by a touch operation as a result of force detection. As illustrated in FIG. 34, in the fourth embodiment, the second system RX2 is coupled to the ADC 43 in touch detection. Also, in the fourth embodiment, both the first system RX1 and the second system RX2 are coupled to the resistance change detection circuit 47 in force detection.

As described above, the touch detection electrodes TDL according to the fourth embodiment each include the two systems. This configuration can provide the touch detection signals Vdet not passing through the force detector 71 or 72 without increasing the number of touch detection electrodes TDL. In other words, according to the fourth embodiment, the output of the touch detection signals Vdet can be easily increased and the power consumption in outputting the touch detection signals Vdet is reduced.

Second Modification

Figure 36:
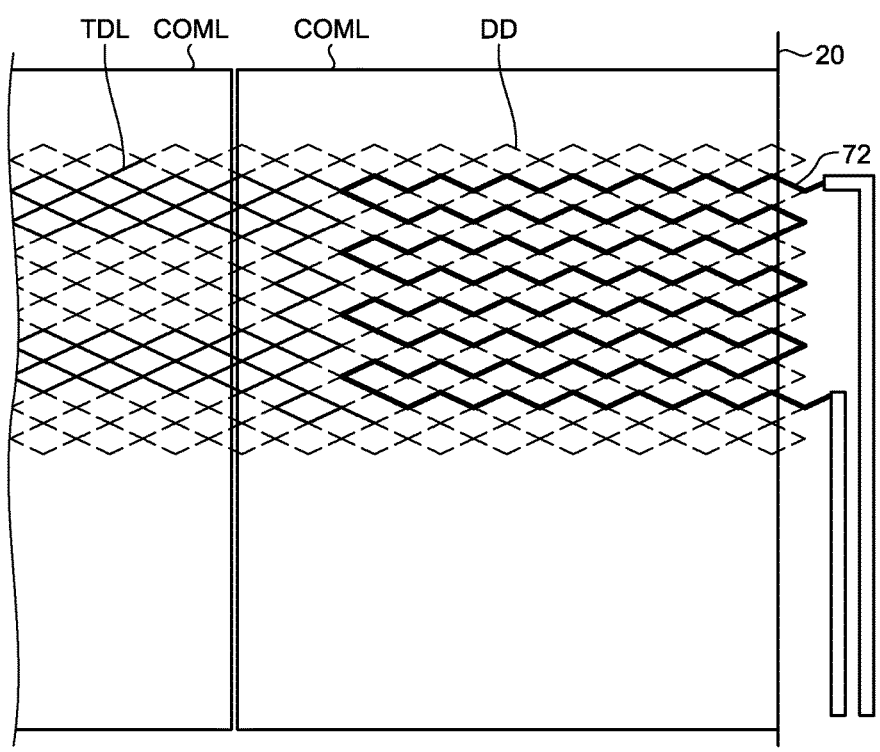
FIG. 36 is a diagram of an example of a specific configuration of the force detector and a portion near the force detector according to a second modification.

The following describes a modification (second modification) of the first to the fourth embodiments with reference to FIG. 36. In the description of the second modification, components similar to those of the first to the fourth embodiments are denoted by the same reference numerals, and explanation thereof may be omitted.

FIG. 36 is a diagram of an example of a specific configuration of the force detector 72 and a portion near the force detector 72 according to the second modification. As illustrated in FIG. 36, the touch detection electrodes TDL may have a mesh structure. While the touch detection electrodes TDL illustrated in FIG. 36 have a rhombic mesh structure, the shape of the mesh is not particularly restricted and may be appropriately changed. As described above, the mesh structure of the electrodes in the display area 20a, such as the touch detection electrodes TDL, can make the touch detection electrodes TDL less likely to be visually recognized, thereby reducing a visual influence of the touch detection electrodes TDL on display output.

As illustrated in FIG. 36, the path of the electrode lines of the strain detection patterns and the folded patterns in the force detector 72 may have the same mesh structure as that of the touch detection electrodes TDL. The sides of the mesh structure may be uncoupled at positions corresponding to the gaps between a plurality of strain detection patterns. This structure can make the strain detection patterns electrically uncoupled in the intersection direction. As a result, the force detector 72 described with reference to FIG. 11 can have a mesh structure. While the folded patterns are not thicker than the strain detection patterns in the mesh structure illustrated in FIG. 36, the strain detection patterns simply need to have a sufficient length in the detection direction. As described above, the force detectors 72 have the same mesh structure as that of the electrodes in the display area 20a, such as the touch detection electrodes TDL. This structure can reduce a visual influence caused in a case where the force detectors 72 are arranged in the display area 20a. In other words, while the force detectors 72 are arranged outside the display area 20a according to the first to the fourth embodiments, the force detectors 72 can be easily arranged inside the display area 20a according to the second modification.

As illustrated in FIG. 36, dummy electrodes DD may be arranged around the touch detection electrodes TDL and the force detectors 72. The dummy electrodes DD have a mesh structure (e.g., a rhombic shape) the sides of which are cut off. With the dummy electrodes DD, the configurations arranged according to their functions, such as the touch detection electrodes TDL and the force detectors 72, can be provided as part of a wider mesh structure including the dummy electrodes DD. In other words, the dummy electrodes DD can widen the mesh structure in the display area 20a, thereby making the mesh structure less likely to be visually recognized compared with a case where the mesh structure is locally provided.

While the force detector 72 having a mesh structure is illustrated in FIG. 36, the same mesh structure may also be applied to the force detector 71. The above mentioned electrodes having a mesh structure and the dummy electrodes DD may be made of metal.

As described above, the second modification facilitates arrangement of the strain gauges (force detectors 71 and 72) in the display area 20a. Consequently, the second modification can make the frame area thinner.

Fifth Embodiment

The following describes an embodiment (fifth embodiment) part of the configuration of which is different from those of the first to the fourth embodiments with reference to FIGS. 37 to 43. In the description of the fifth embodiment, components similar to those of the first to the fourth embodiments are denoted by the same reference numerals, and explanation thereof may be omitted.

Figure 37:
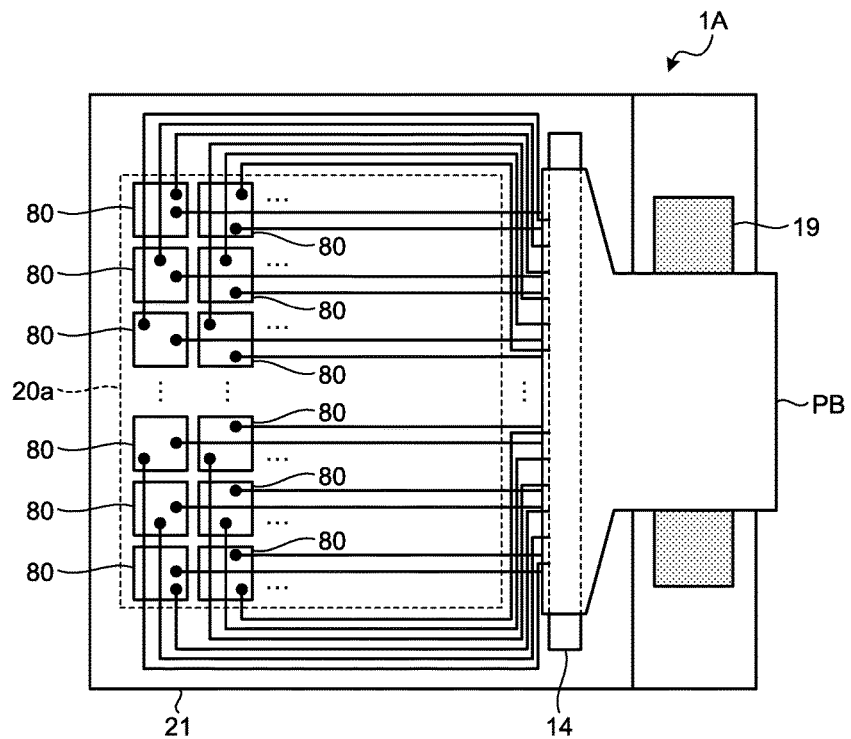
FIG. 37 is a diagram of an example of a module provided with the display apparatus with a touch detection function according to a fifth embodiment.

FIG. 37 is a diagram of an example of a module 1A provided with the display apparatus with a touch detection function according to the fifth embodiment. The module 1A of the fifth embodiment includes touch detection electrodes 80 instead of the touch detection electrodes TDL. The touch detection electrodes 80 are self-capacitive electrodes having capacitance that changes depending on a touch operation performed on the touch detection surface. Specifically, as illustrated in FIG. 37, for example, the touch detection electrodes 80 are arranged in a two-dimensional matrix in the display area 20a. The touch detection electrodes 80 are electrically coupled to the drive electrode driver 14 and the printed circuit board PB via wiring provided using a wiring layer. The touch detection electrodes 80 each transmit an output indicating self-capacitance to the printed circuit board PB at a drive timing of the drive electrode driver 14. Because the self-capacitance changes depending on a touch operation performed on the display area 20a, touch detection can be performed based on the outputs from the touch detection electrodes 80.

Figure 38:
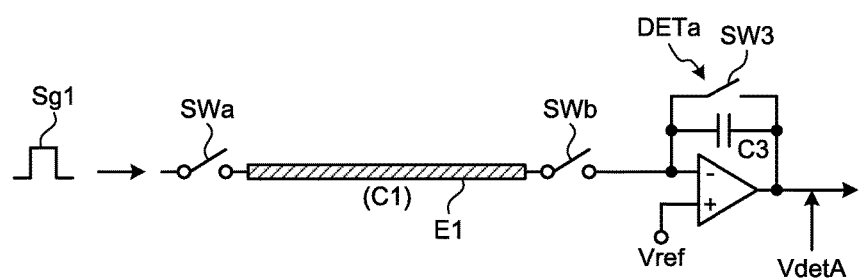
FIG. 38 is a diagram for explaining a basic principle of self-capacitive touch detection and illustrates a state where a finger is neither in contact with nor in proximity to a touch detection electrode.
Figure 39:
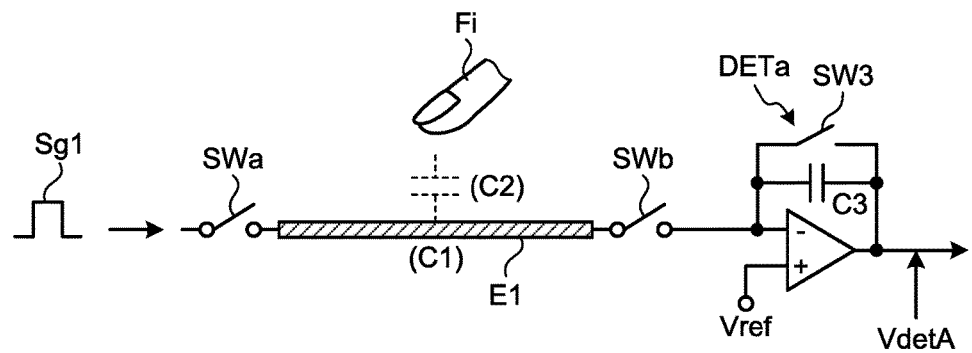
FIG. 39 is a diagram for explaining the basic principle of self-capacitive touch detection and illustrates a state where a finger is in contact with or in proximity to the touch detection electrode.
Figure 40:
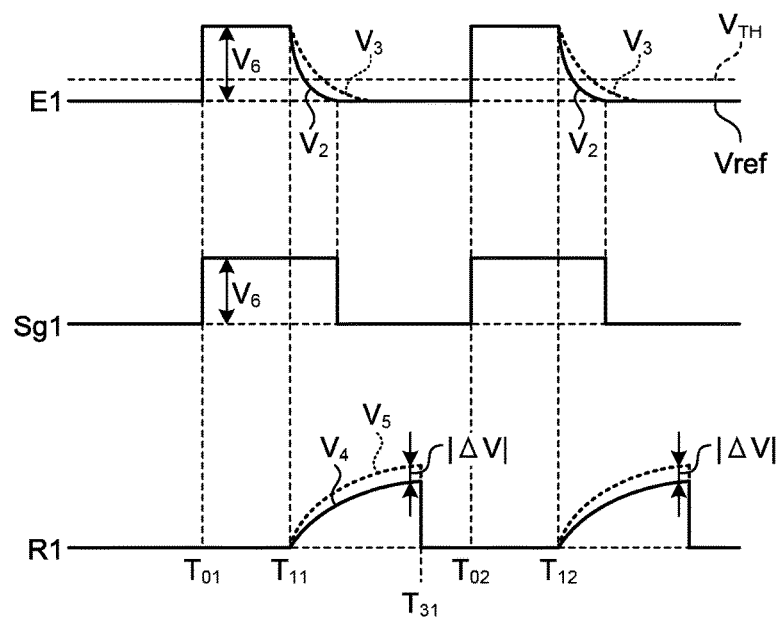
FIG. 40 is a diagram of an example of waveforms of a drive signal and a touch detection signal.

The following describes a basic principle of self-capacitive touch detection with reference to FIGS. 38 to 40. FIG. 38 is a diagram for explaining the basic principle of self-capacitive touch detection and illustrates a state where a finger Fi is neither in contact with nor in proximity to a touch detection electrode. FIG. 39 is a diagram for explaining the basic principle of self-capacitive touch detection and illustrates a state where the finger Fi is in contact with or in proximity to the touch detection electrode. FIG. 40 is a diagram of an example of waveforms of a drive signal and a touch detection signal.

As illustrated in FIG. 38, in a state where the finger Fi is neither in contact with nor in proximity to the touch detection electrode, an AC rectangular wave Sg1 having a predetermined frequency (e.g., frequency on the order of several kilohertz to several hundred kilohertz) is applied to a touch detection electrode E3. The touch detection electrode E3 has capacitance C1, and an electric current corresponding to the capacitance C1 flows. A voltage detector DETa converts the change in the electric current in relation to the AC rectangular wave Sg1 into change in voltage (waveform $V_4$ indicated by the solid line (refer to FIG. 40)).

As illustrated in FIG. 39, in a state where the finger Fi is in contact with or in proximity to the touch detection electrode, capacitance C2 between the finger Fi and the touch detection electrode E3 is added to the capacitance C1 of the touch detection electrode E3. When the AC rectangular wave Sg1 is applied to the touch detection electrode E3, an electric current corresponding to the capacitance C1 and C2 flows. As illustrated in FIG. 40, the voltage detector DETa converts change in the electric current in relation to the AC rectangular wave Sg1 into change in voltage (waveform $V_5$ indicated by the dotted line). By integrating the voltage values of the waveforms $V_4$ and $V_5$ and comparing these values, it is determined whether the finger Fi is in contact with or in proximity to the touch detection electrode E3. Alternatively, another method may be employed, such as a method of calculating respective periods required for a waveform $V_2$ and a waveform $V_3$ illustrated in FIG. 40 to decrease to predetermined reference voltage and comparing the periods.

Specifically, as illustrated in FIGS. 38 and 39, the touch detection electrode E3 can be cut off by a switch SWa and a switch SWb. In FIG. 40, the voltage level of the AC rectangular wave Sg1 raises by an amount corresponding to voltage $V_6$ at time $T_{01}$. At this time, the switch SWa is turned on, and the switch SWb is turned off. As a result, the voltage in the touch detection electrode E3 is also raised by $V_6$. When the switch SWa is turned off, the touch detection electrode E3 gets into a floating state. At this time, the voltage in the touch detection electrode E3 is maintained at $V_6$ by the capacitance C1 (refer to FIG. 38) of the touch detection electrode or capacitance (C1+C2, refer to FIG. 39) obtained by adding the capacitance C2 generated by contact or proximity of the finger Fi or the like to the capacitance C1 of the touch detection electrode. Subsequently, a switch SW3 is turned on before time $T_{11}$ and is turned off after a predetermined time has elapsed, thereby resetting the voltage detector DETa. With this reset operation, the output voltage is made substantially equal to reference voltage Vref.

Subsequently, when the switch SWb is turned on at time $T_{11}$, the voltage in an inversion input end of the voltage detector DETa increases to the voltage $V_6$ equal to that of the touch detection electrode E3. Subsequently, the voltage in the inversion input end of the voltage detector DETa decreases to the reference voltage Vref based on a time constant of the capacitance C1 (or C1+C2) of the touch detection electrode E3 and the capacitance C3 in the voltage detector DETa. At this time, the electric charges accumulated in the capacitance C1 (or C1+C2) of the touch detection electrode E3 move to the capacitance C3 in the voltage detector DETa, whereby an output (VdetA) from the voltage detector DETa increases. When the finger Fi or the like is not in proximity to the touch detection electrode E3, the output (VdetA) from the voltage detector DETa is represented by the waveform $V_4$ indicated by the solid line, and R1=C1·$V_6$/C3 is satisfied. When capacitance generated by an effect of the finger Fi or the like is added, the output is represented by the waveform $V_5$ indicated by the dotted line, and VdetA= (C1+C2)·$V_6$/C3 is satisfied. Subsequently, at time $T_{31}$ after the electric charges in the capacitance C1 (or C1+C2) of the touch detection electrode E3 sufficiently move to the capacitance C3, the switch SWb is turned off, and the switch SWa and the switch SW3 are turned on. As a result, the electric potential of the touch detection electrode E3 decreases to a low level equal to that of the AC rectangular wave Sg1, and the voltage detector DETa is reset. The timing to turn on the switch SWa may be any timing as long as it is after the turning off of the switch SWb and before time $T_{02}$. The timing to reset the voltage detector DETa may be any timing as long as it is after the turning off of the switch SWb and before time $T_{12}$. The operation described above is repeatedly performed at a predetermined frequency (e.g., frequency on the order of several kilohertz to several hundred kilohertz). The touch detector 40 can determine whether an external proximate object is present (whether a touch operation is performed) based on the absolute value |ΔV| of the difference between the waveform $V_4$ and the waveform $V_5$. As illustrated in FIG. 40, when the finger Fi or the like is not in proximity to the touch detection electrode, the electric potential of the touch detection electrode E3 is represented by the waveform $V_2$. By contrast, when the capacitance C2 generated by an effect of the finger Fi or the like is added, the electric potential is represented by the waveform $V_3$. By measuring a time required for the waveforms $V_2$ and $V_3$ to decrease to predetermined voltage $V_{TH}$, the touch detector 40 may determine whether an external proximate object is present (whether a touch operation is performed).

The various methods for detecting force described with reference to FIGS. 12 to 17 are also applicable to the fifth embodiment. Specifically, for example, the coupling end U is provided at one of the wiring between the drive electrode driver 14 illustrated in FIG. 37 and the touch detection electrodes 80 and the wiring between the touch detection electrodes 80 and the printed circuit board PB, and the coupling line Q is coupled to the other thereof. With this configuration, the various methods for detecting force can be applied to the fifth embodiment.

Figure 41:
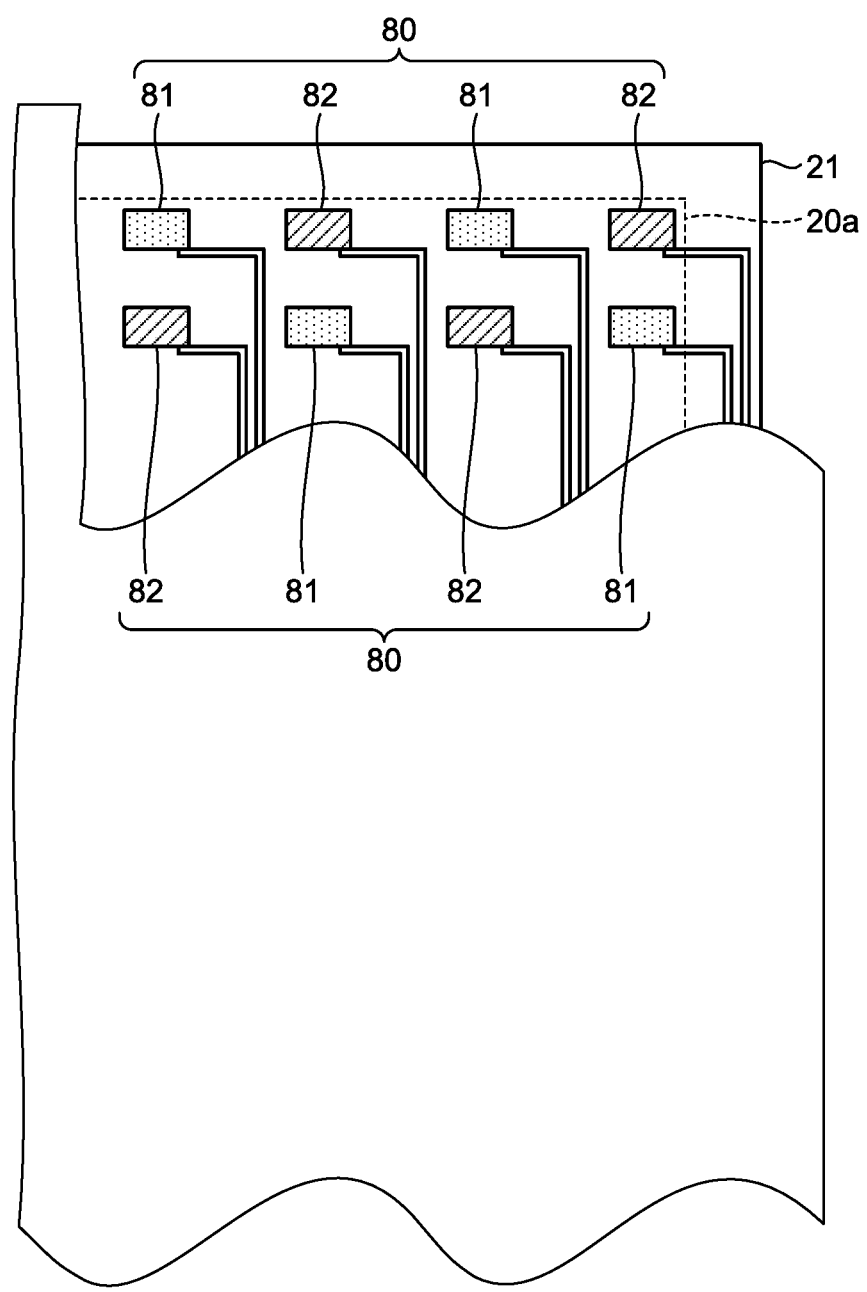
FIG. 41 is a diagram of exemplary arrangement of the touch detection electrodes.
Figure 42:
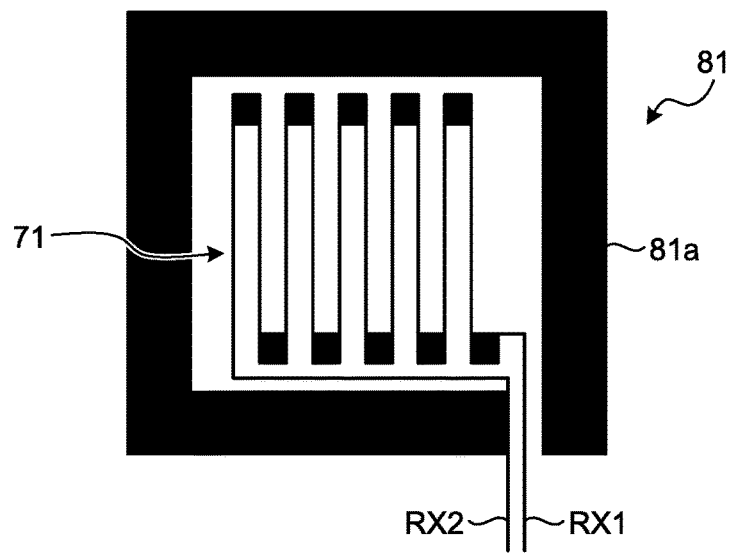
FIG. 42 is a diagram of an example of a specific configuration of the force detector and a portion near the force detector according to the fifth embodiment.
Figure 43:
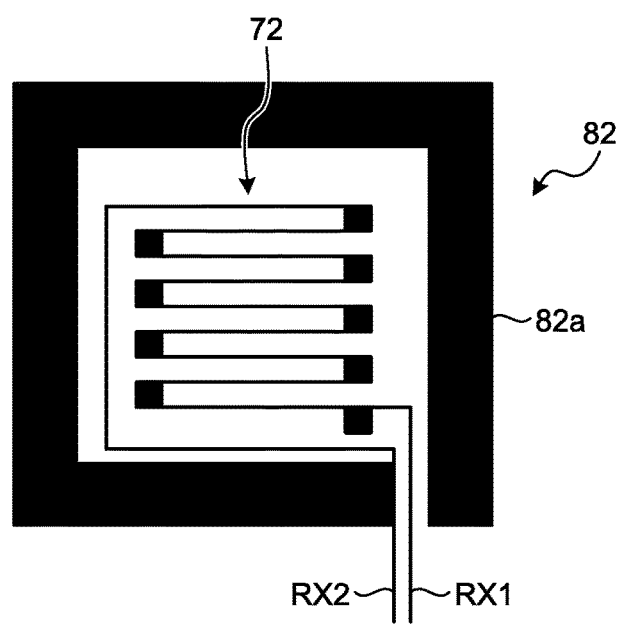
FIG. 43 is a diagram of an example of a specific configuration of the force detector and a portion near the force detector according to the fifth embodiment.

The touch detection electrodes 80 have a structure to detect force. Specifically, the touch detection electrodes 80 arranged in a two-dimensional matrix include touch detection electrodes 81 and touch detection electrodes 82 (FIGS. 41 to 43). Each of the touch detection electrodes 81 is provided with the touch detector 71, whereas each of the touch detection electrodes 82 is provided with the touch detector 72.

FIG. 41 is a diagram of exemplary arrangement of the touch detection electrodes 81 and 82. As illustrated in FIG. 41, the touch detection electrodes 81 and 82 are alternately arranged in the row and column directions.

FIG. 42 is a diagram of an example of a specific configuration of the force detector 71 and a portion near the force detector 71 according to the fifth embodiment. FIG. 43 is a diagram of an example of a specific configuration of the force detector 72 and a portion near the force detector 72 according to the fifth embodiment. FIGS. 42 and 43 do not illustrate the wiring that couples the touch detection electrodes 81 and 82 to the drive electrode driver 14. As illustrated in FIG. 42, for example, the touch detection electrode 81 with the force detector 71 includes a self-capacitance forming electrode 81a serving as an electrode having rectangular four sides surrounding the force detector 71. As illustrated in FIG. 43, for example, the touch detection electrode 82 with the force detector 72 includes a self-capacitance forming electrode 82a serving as an electrode having rectangular four sides surrounding the force detector 72. The shape of the self-capacitance forming electrodes 81a and 82a may be appropriately changed.

In the fifth embodiment, switching operations are performed in touch detection and in force detection in the same manner as that of the fourth embodiment described with reference to FIGS. 34 and 35. The configuration of the touch detector 40 on the downstream side of the ADC 43 according to the fifth embodiment is a configuration on which an algorithm for performing self-capacitive detection is implemented. One of the four sides of the self-capacitance forming electrodes 81a and 82a has a cut-out through which the wiring of the first system RX1 coupled to the force detector 71 passes, and the wiring is coupled to the switch SW3. The force detector 71 and the self-capacitance forming electrode 81a share the wiring of the second system RX2, and the wiring is coupled to the switch SW2. The same can be applied to the coupling relation between the self-capacitance forming electrode 82a and wiring.

As described above, according to the fifth embodiment, the strain gauges (force detectors 71 and 72) can be arranged in a matrix in the display area 20a.

Sixth Embodiment

The following describes an embodiment (sixth embodiment) part of the configuration of which is different from those of the first to the fifth embodiments with reference to FIGS. 44 to 50. In the description of the sixth embodiment, components similar to those of the first to the fifth embodiments are denoted by the same reference numerals, and explanation thereof may be omitted.

Figure 44:
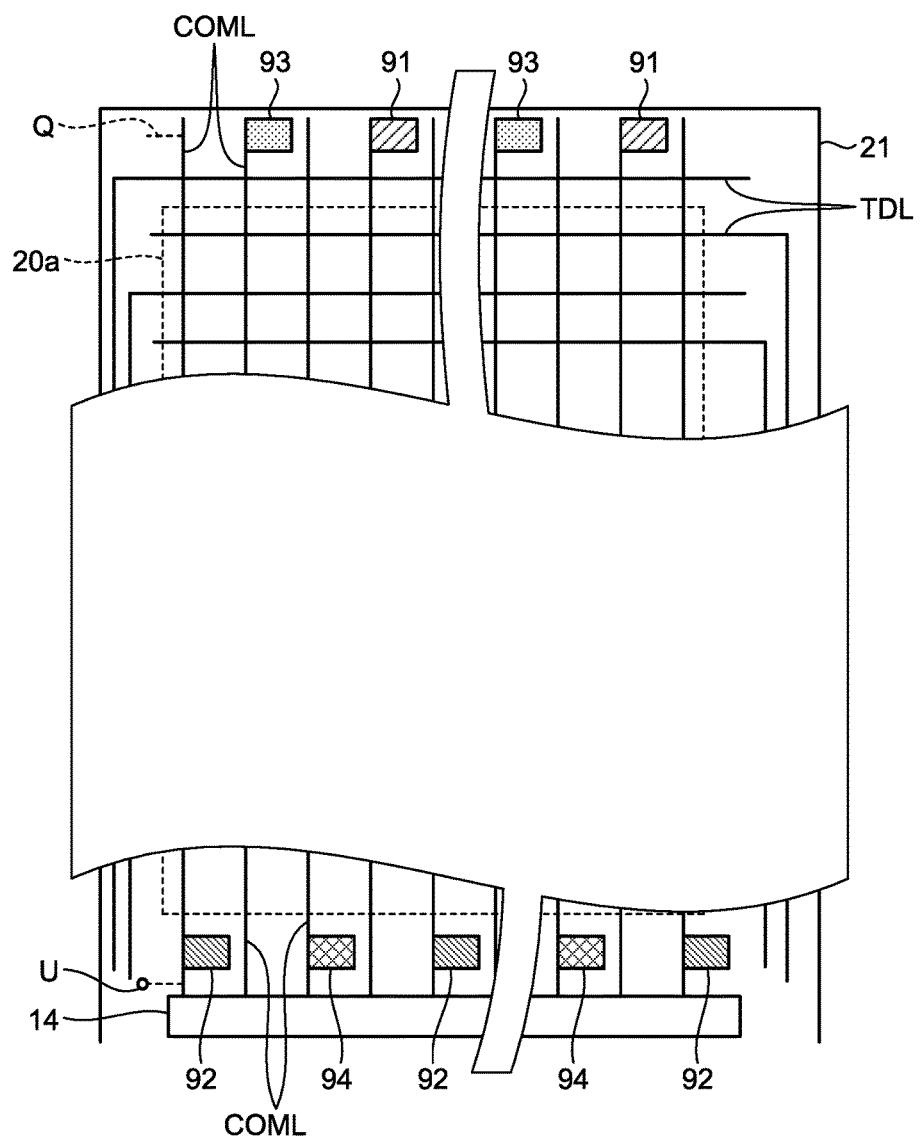
FIG. 44 is a schematic wiring diagram of exemplary arrangement of the force detectors according to a sixth embodiment.

FIG. 44 is a schematic wiring diagram of exemplary arrangement of force detectors 91, 92, 93, and 94 according to the sixth embodiment. Each of the force detectors 91, 92, 93, and 94 according to the sixth embodiment is integrated with a corresponding one of the drive electrodes COML. The various methods for detecting force described with reference to FIGS. 12 to 17 are also applicable to the sixth embodiment. Specifically, the coupling end U is provided on the force detectors 91, 92, 93, and 94 side of the drive electrodes COML, and the coupling line Q is provided on the side opposite thereto. With this configuration, the various methods for detecting force can be applied to the sixth embodiment.

Figure 45:
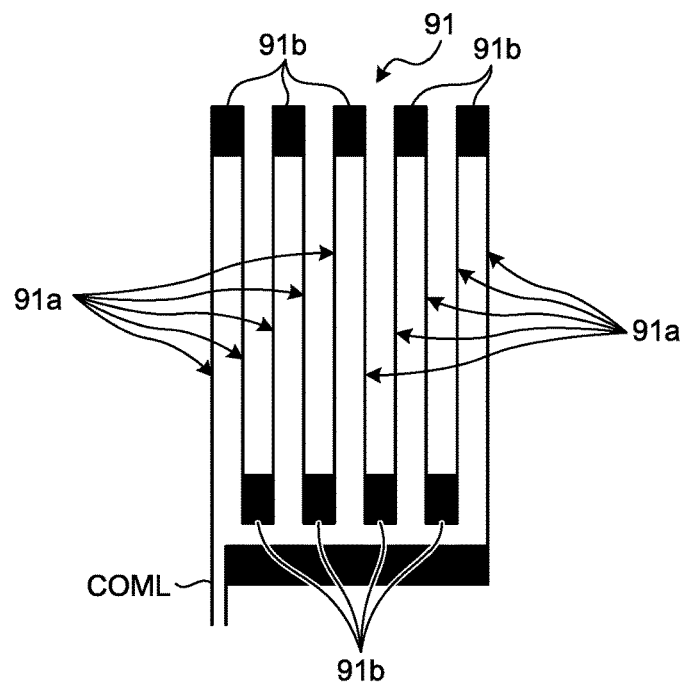
FIG. 45 is a diagram of an example of a specific configuration of the force detector and a portion near the force detector.
Figure 46:
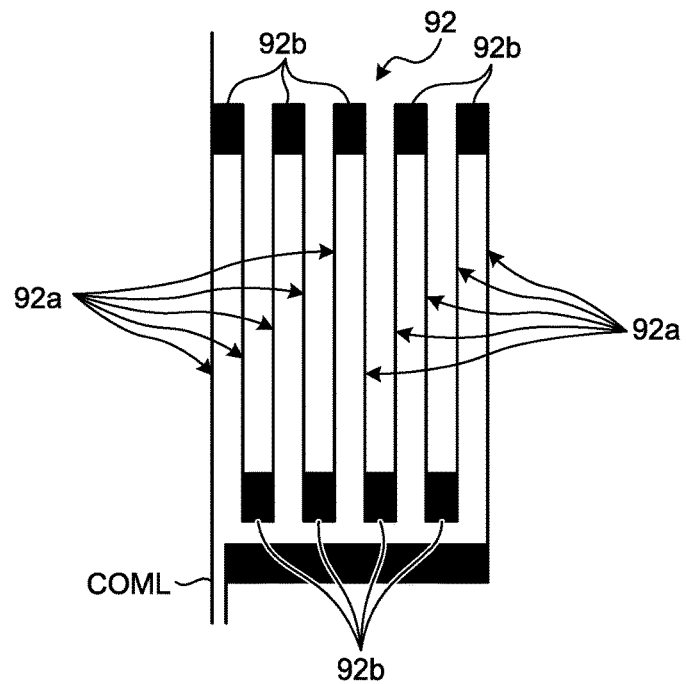
FIG. 46 is a diagram of an example of a specific configuration of the force detector and a portion near the force detector.

FIG. 45 is a diagram of an example of a specific configuration of the force detector 91 and a portion near the force detector 91. FIG. 46 is a diagram of an example of a specific configuration of the force detector 92 and a portion near the force detector 92. The force detector 91 has strain detection patterns 91a and folded patterns 91b having the same detection direction and the same intersection direction as those of the force detector 71. The force detector 92 has strain detection patterns 92a and folded patterns 92b having the same detection direction and the same intersection direction as those of the force detector 71. Each of the drive electrodes COML has one end and the other end opposite to the one end. As illustrated in FIGS. 44 and 45, each of the force detectors 91 is provided as a component connected to a corresponding one of the drive electrodes COML at the one end thereof. As illustrated in FIGS. 44 and 46, each of the force detectors 92 is provided as a component connected to a corresponding one of the drive electrodes COML at the other end thereof. More specifically, a side of the frame area provided with the force detectors 91 is opposite to a side of the frame area provided with the force detectors 92 with the display area 20a sandwiched therebetween.

Figure 47:
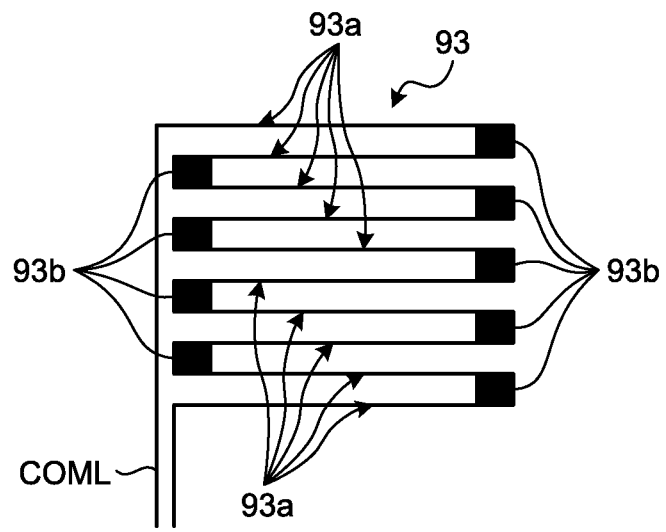
FIG. 47 is a diagram of an example of a specific configuration of the force detector and a portion near the force detector.
Figure 48:
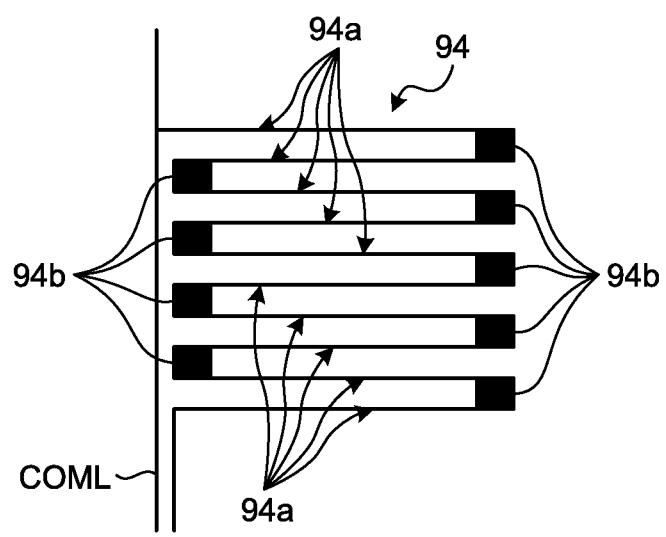
FIG. 48 is a diagram of an example of a specific configuration of the force detector and a portion near the force detector.

FIG. 47 is a diagram of an example of a specific configuration of the force detector 93 and a portion near the force detector 93. FIG. 48 is a diagram of an example of a specific configuration of the force detector 94 and a portion near the force detector 94. The force detector 93 has strain detection patterns 93a and folded patterns 93b having the same detection direction and the same intersection direction as those of the force detector 72. The force detector 94 has strain detection patterns 94a and folded patterns 94b having the same detection direction and the same intersection direction as those of the force detector 72. As illustrated in FIGS. 44 and 47, each of the force detectors 93 is provided as a component connected to a corresponding one of the drive electrodes COML at the one end thereof. As illustrated in FIGS. 44 and 48, each of the force detectors 94 is provided as a component connected to a corresponding one of the drive electrodes COML at the other end thereof. More specifically, a side of the frame area provided with the force detectors 93 is opposite to a side of the frame area provided with the force detectors 94 with the display area 20a sandwiched therebetween.

The force detectors 91, 92, 93, and 94 according to the sixth embodiment detect force with the same mechanism as that of the first embodiment. In other words, the drive electrodes COML according to the sixth embodiment are supplied with voltage for force detection at the timing of force detection. The voltage may be supplied by the drive electrode driver 14 or another component, such as the constant voltage circuit 15. Output lines of the force detectors 91, 92, 93, and 94 output signals indicating the electrical resistance in the force detectors 91, 92, 93, and 94, respectively, according to the supply of voltage. The output lines may be provided in the same layer as that of the drive electrodes COML or another layer.

Figure 49:
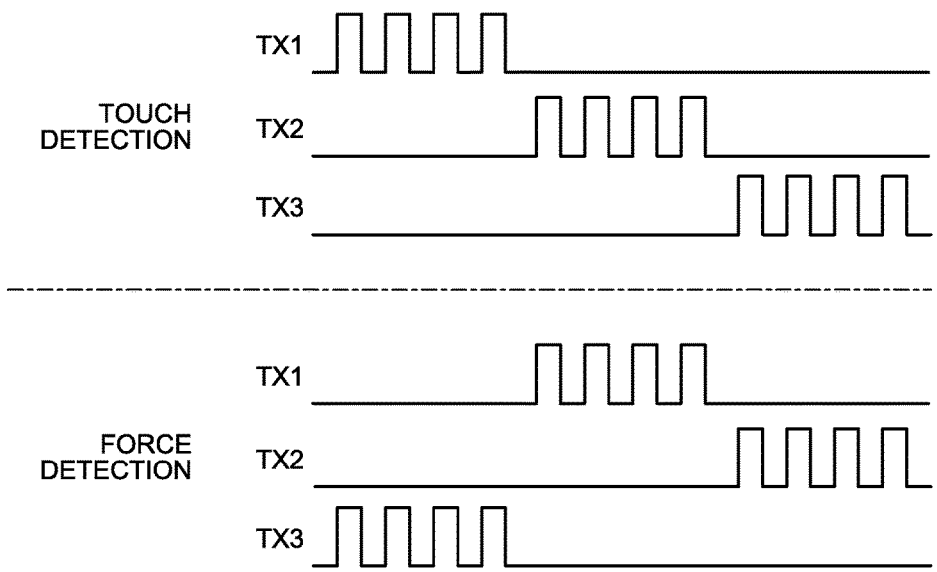
FIG. 49 is a timing chart schematically illustrating an example of the relation between touch detection timings and force detection timings according to the sixth embodiment.

FIG. 49 is a timing chart schematically illustrating an example of the relation between touch detection timings and force detection timings according to the sixth embodiment. In FIG. 49, to distinguish the operation timings of three different drive electrodes COML, the timing charts of the respective drive electrodes COML are denoted by TX1, TX2, and TX3. The waveforms of the timing charts illustrated in FIG. 49 do not indicate the height or the like of voltage of signals but simply indicate the timings. As illustrated in FIG. 49, for example, a timing (time slot) to supply the drive electrode COML with the drive signal Vcom for forming capacitance with the touch detection electrodes TDL in touch detection is different from a timing (time slot) to supply the drive electrode COML with voltage for performing force detection, the force detection according to the sixth embodiment being performed using the force detectors 91, 92, 93, and 94. While the timing charts illustrated in FIG. 49 have timings (time slots) when neither touch detection nor force detection is performed in terms of an operation of one drive electrode COML, one of touch detection and force detection may be performed at the timings (in the time slots). While FIG. 49 illustrates the timing charts of three drive electrodes COML, the fourth drive electrode COML and those subsequent thereto also operate at different timings similarly to the relation between the three drive electrodes COML illustrated in FIG. 49.

Figure 50:
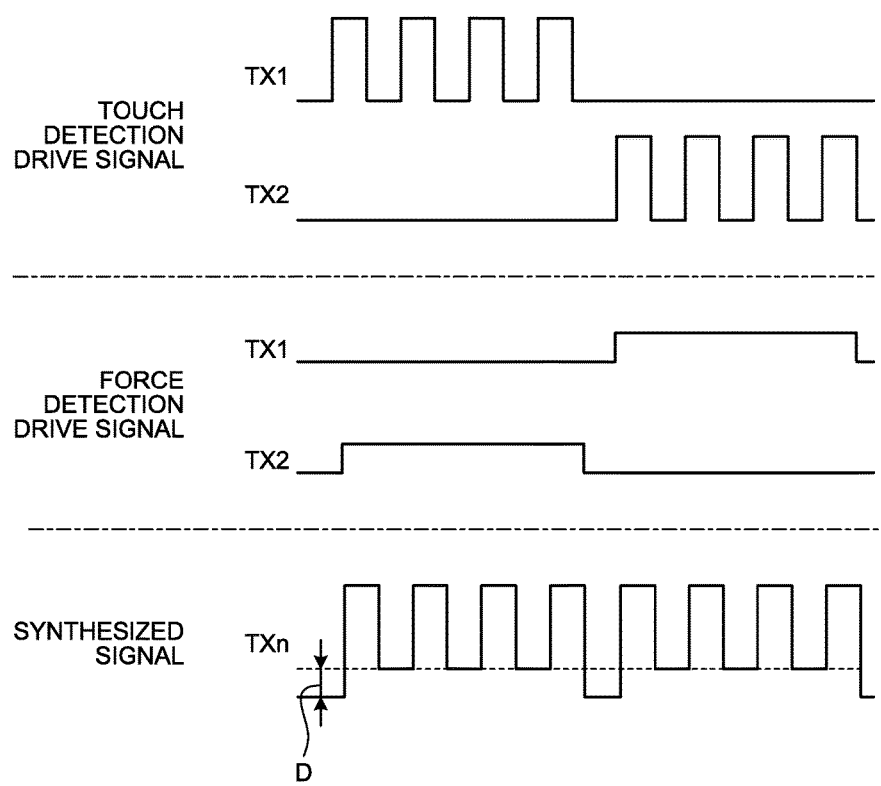
FIG. 50 is a schematic waveform diagram of an example of the relation between a synthesized signal for forming capacitance between the touch detection electrode and the drive electrode, a drive signal for touch detection, and a drive signal for force detection.

FIG. 50 is a schematic waveform diagram of an example of the relation between a synthesized signal for forming capacitance between the touch detection electrode TDL and the drive electrode COML, the drive signal Vcom for touch detection, and a drive signal (supply of voltage) for force detection. According to the sixth embodiment, for example, at a timing when part of the drive electrodes COML are supplied with the drive signal Vcom for touch detection, other part thereof may possibly be supplied with voltage for force detection, as illustrated in FIGS. 49 and 50. In terms of the touch detection electrodes TDL, as illustrated in FIG. 50, signals each of which is obtained by synthesizing the drive signal Vcom with the voltage for force detection are supplied from the drive electrodes COML. The potential difference caused by an increase in voltage in association with supply of the voltage used for force detection is significantly smaller than the potential difference in the rise and fall patterns of the voltage indicated by the drive signal Vcom used for touch detection. As a result, as illustrated in FIG. 50, the potential difference in the rise and fall patterns of the voltage caused by the drive signal Vcom used for touch detection is large enough to be recognized in the synthesized signals. In the sixth embodiment, the synthesized signals is corrected considering the potential difference (D1) caused by supply of the voltage for force detection. The correction is performed by the signal processor 44, for example. Alternatively, the correction may be performed by a dedicated component.

The sixth embodiment is applicable to both mutual capacitive and self-capacitive display apparatuses with a touch detection function. In a case where the sixth embodiment is applied to a display apparatus, the display apparatus does not require the force detector 71 or 72 according to the first to the fifth embodiments. The sixth embodiment can be applied to any configuration as long as it includes the drive electrodes COML. The sixth embodiment may be applied to a display apparatus having no touch detection function. In this case, the display apparatus does not require components that detect a touch operation, such as the touch detection electrodes TDL. As described above, the display apparatus according to the sixth embodiment includes the strain gauge integrated with the drive electrode used to drive the pixels. The strain gauge is any one of the force detectors 91, 92, 93, and 94, for example.

As described above, according to the sixth embodiment, the strain gauge (e.g., the force detectors 91, 92, 93, and 94) is integrated with the drive electrode used to drive the pixels. As a result, the configuration that performs display can be integrated with the configuration that performs force detection. Thus, force can be detected by a configuration integrated with a component used for another configuration (configuration that performs display).

Third Modification

The following describes a modification (third modification) of the sixth embodiment with reference to FIGS. 51 to 55. In the description of the third modification, components similar to those of the sixth embodiment are denoted by the same reference numerals, and explanation thereof may be omitted.

Figure 51:
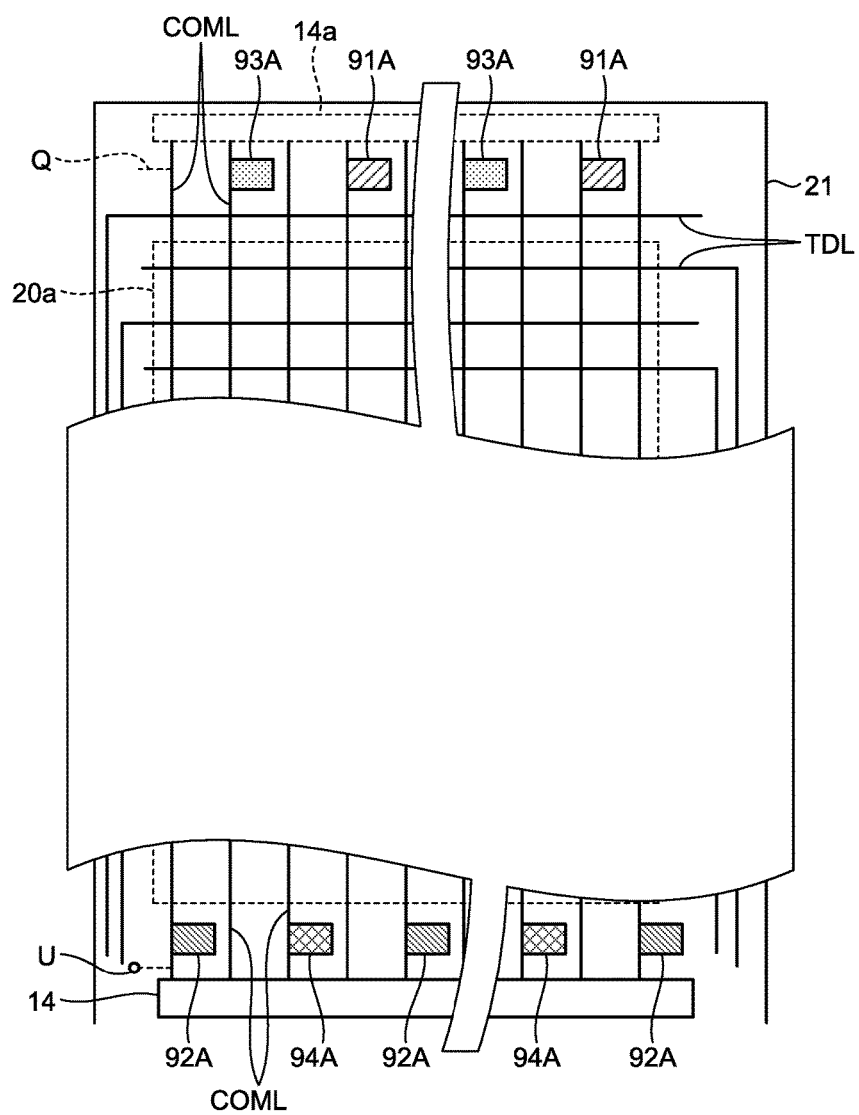
FIG. 51 is a schematic wiring diagram of exemplary arrangement of the force detectors according to a third modification.
Figure 52:
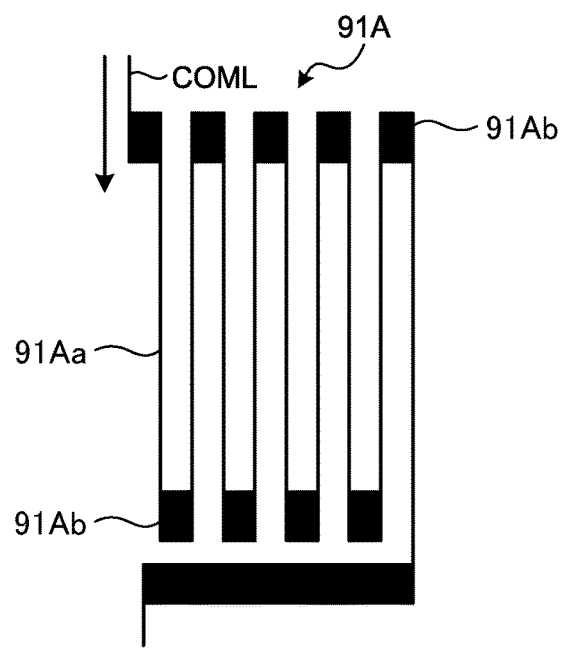
FIG. 52 is a diagram of an example of a specific configuration of the force detector and a portion near the force detector.
Figure 53:
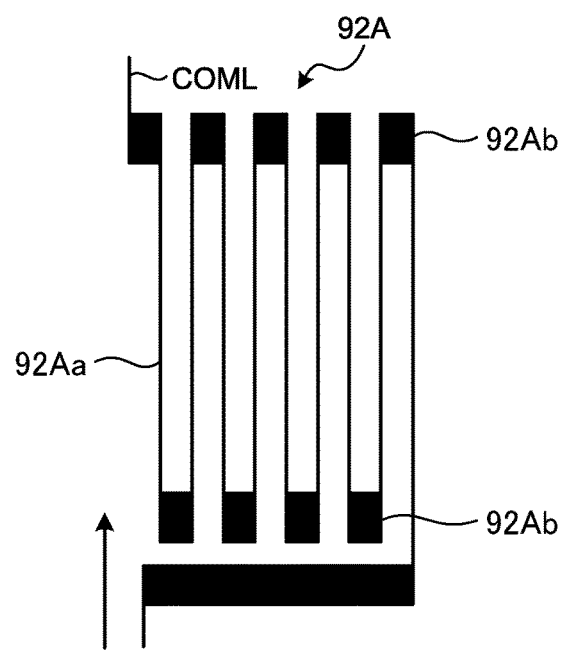
FIG. 53 is a diagram of an example of a specific configuration of the force detector and a portion near the force detector.
Figure 54:
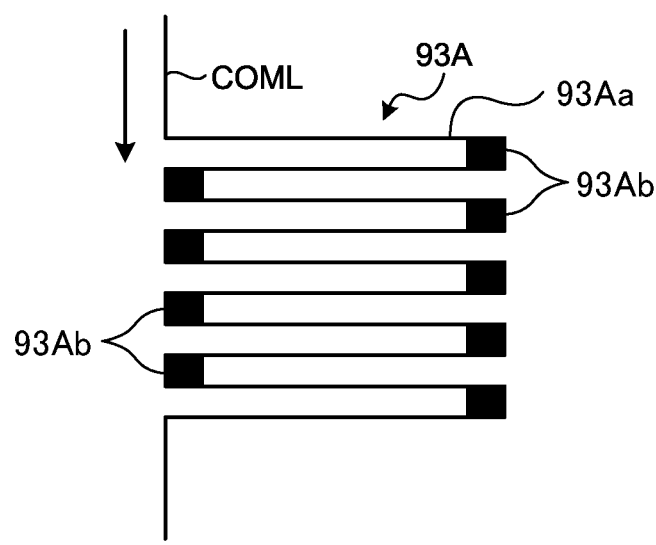
FIG. 54 is a diagram of an example of a specific configuration of the force detector and a portion near the force detector.
Figure 55:
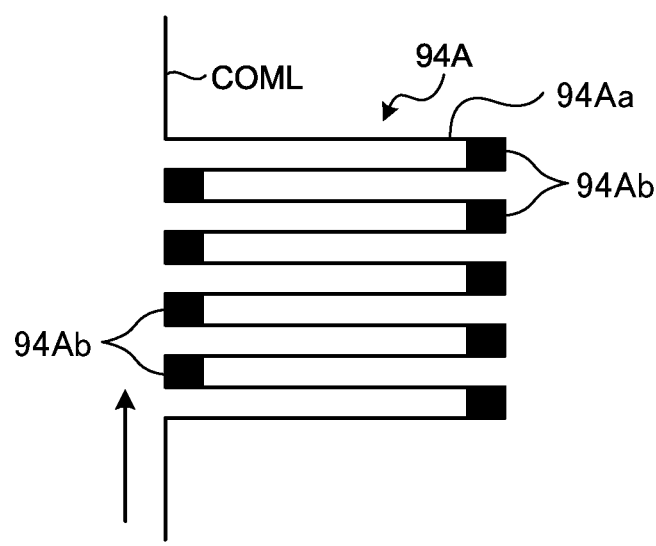
FIG. 55 is a diagram of an example of a specific configuration of the force detector and a portion near the force detector.

FIG. 51 is a schematic wiring diagram of exemplary arrangement of force detectors 91A, 92A, 93A, and 94A according to the third modification. FIG. 52 is a diagram of an example of a specific configuration of the force detector 91A and a portion near the force detector 91A. FIG. 53 is a diagram of an example of a specific configuration of the force detector 92A and a portion near the force detector 92A. FIG. 54 is a diagram of an example of a specific configuration of the force detector 93A and a portion near the force detector 93A. FIG. 55 is a diagram of an example of a specific configuration of the force detector 94A and a portion near the force detector 94A. The force detector 91A has strain detection patterns 91Aa and folded patterns 91Ab. The force detector 92A has strain detection patterns 92Aa and folded patterns 92Ab. The force detector 93A has strain detection patterns 93Aa and folded patterns 93Ab. The force detector 94A has strain detection patterns 94Aa and folded patterns 94Ab. In the FIGS. 52 to 55, some reference numerals of the strain detection patterns 91Aa to 94Aa and folded patterns 91Ab to 94Ab are omitted. The arrangement of the force detectors 91A, 92A, 93A, and 94A according to the third modification is the same as that of the force detectors 91, 92, 93, and 94 according to the sixth embodiment. In the sixth embodiment, the output lines of the force detectors 91, 92, 93, and 94 that respectively output signals indicating the electrical resistance of the force detectors 91, 92, 93, and 94 according to the supply of voltage are wiring different from the drive electrodes COML. By contrast, in the third modification, the output lines of the force detectors 91A, 92A, 93A, and 94A also serve as the drive electrodes COML as illustrated in FIGS. 52 to 55.

Specifically, as illustrated in FIG. 51, for example, a display apparatus with a touch detection function of the third modification includes the drive electrode driver 14 and a relay 14a. The drive electrode driver 14 is provided at one ends of the drive electrodes COML, and the relay 14a is provided at the other ends of the drive electrodes COML. The drive electrode driver 14 and the relay 14a face each other with the display area 20a sandwiched therebetween. The relay 14a applies the drive signal Vcom received from the drive electrode driver 14 to the drive electrode COML from the end of the drive electrode COML positioned opposite to the drive electrode driver 14 with the display area 20a sandwiched therebetween. The relay 14a, for example, is coupled to wiring that transmits the drive signal Vcom received from the drive electrode driver 14 to the end of the drive electrode COML positioned opposite to the drive electrode driver 14 with the display area 20a sandwiched therebetween. The relay 14a may be a drive electrode driver provided separately from the drive electrode driver 14. The various methods for detecting force described with reference to FIGS. 12 to 17 are also applicable to the third modification similarly to the sixth embodiment.

The drive signal Vcom according to the third modification passes through the force detector integrated with the drive electrode COML and reaches the drive electrode COML in the display area 20a. The force detector integrated with the drive electrode COML is one of the force detectors 91A, 92A, 93A, and 94A. Specifically, the force detectors 91A and 93A provided on the relay 14a side and the drive electrodes COML integrated therewith are supplied with the drive signal Vcom from the relay 14a. By contrast, the force detectors 92A and 94A provided on the drive electrode driver 14 side and the drive electrodes COML integrated therewith are supplied with the drive signal Vcom from the drive electrode driver 14.

As described above, according to the third modification, the electrical systems of the respective drive electrodes COML are integrated into one system.

Fourth Modification

Figure 56:
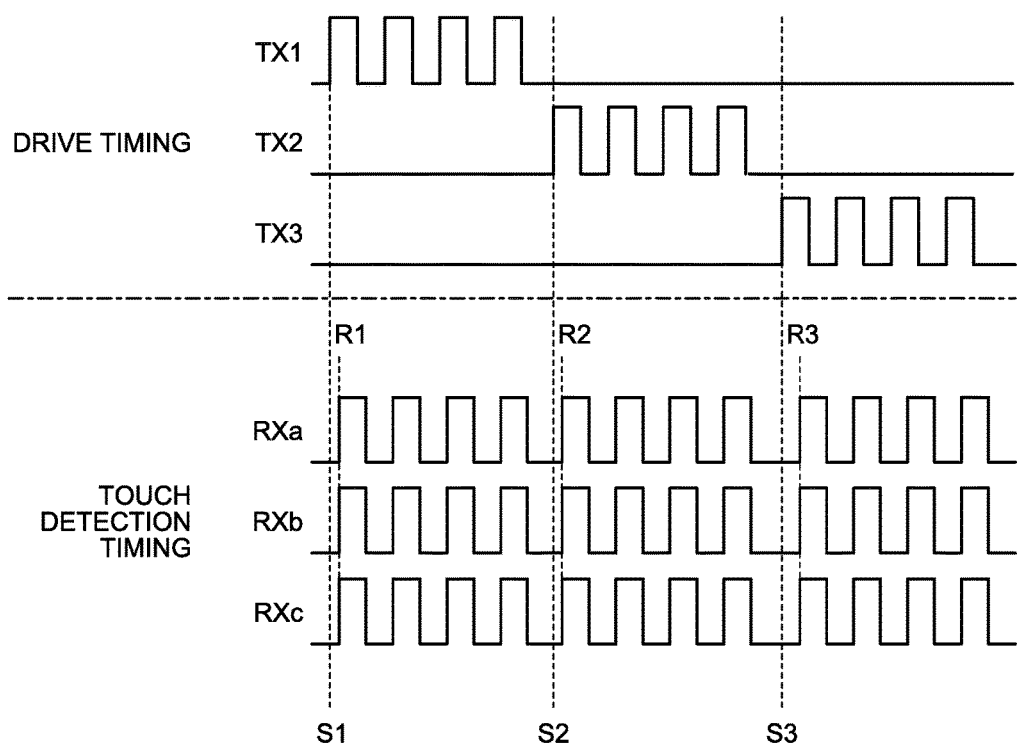
FIG. 56 is a timing chart schematically illustrating an example of the relation between drive timings of the drive electrodes and touch detection timings of the touch detection electrodes in touch detection according to a fourth modification.

The following describes a modification (fourth modification) of the sixth embodiment with reference to FIG. 56. In the description of the fourth modification, components similar to those of the sixth embodiment are denoted by the same reference numerals, and explanation thereof may be omitted.

FIG. 56 is a timing chart schematically illustrating an example of the relation between drive timings of the drive electrodes COML and touch detection timings of the touch detection electrodes TDL in touch detection according to the fourth modification. In FIG. 56, to distinguish the touch detection timings of three different touch detection electrodes TDL, timing charts of the respective touch detection electrodes TDL are denoted by RXa, RXb, and RXc. In the sixth embodiment, touch detection and force detection can be performed in parallel using the touch detection signals Vdet in capacitive touch detection. Specifically, as illustrated in FIG. 56, for example, when the drive signal Vcom is supplied to one of the drive electrodes COML in touch detection, the touch detection signals Vdet are output from the touch detection electrodes TDL at a timing later than the supply timing of the drive electrode COML. If force is applied by a touch operation, the electrical resistance in the drive electrodes provided with the force detectors (e.g., the force detectors 91, 92, 93, and 94) increases compared with a case where no force is applied. In other words, if force is applied by a touch operation, the gap between the supply timing of the drive electrode COML and the output timing of the touch detection signals Vdet in touch detection increases compared with a case where no force is applied. As illustrated in FIG. 56, for example, the gap between a supply timing S3 of the drive electrode COML and an output timing R3 of the touch detection signals Vdet obtained when force is applied by a touch operation is larger than the gaps between supply timings S1 and S2 of the drive electrode COML and output timings R1 and R2 of the touch detection signals Vdet, respectively, obtained when no force is applied.

The processing for detecting force described with reference to FIG. 56 is performed by the signal processor 44, for example. In other words, the touch detector 40 according to the fourth modification serves as a detector that detects force based on the output timing of the drive signal for forming an electric field and the output timing of touch detection signal from the touch detection electrodes. In a similar manner to the first embodiment and other embodiments, the drive electrodes according to the fourth modification that performs force detection are not in contact with the touch detection electrodes to form an electric field between the touch detection electrodes and the drive electrodes according to the drive signal.

As described above, according to the fourth modification, force detection can be performed simultaneously with touch detection. As a result, there is no need to supply voltage for force detection to the strain gauge (e.g., the force detectors 91A, 92A, 93A, and 94A) at a timing different from the timing of touch detection or no need for restrictions on the timings. Consequently, the fourth modification does not require the constant voltage circuit 15, for example.

While the first to the sixth embodiments and the first to the fourth modifications have been described, the configuration of the present invention may be appropriately changed within the range specified by the invention specification items described in the claims. The first embodiment and the other embodiments and modifications, for example, employ what is called an in-cell apparatus in which the drive electrodes COML are shared by the configuration that performs touch detection and the configuration that performs display output. Alternatively, the display apparatus with a touch detection may be applied to what is called an on-cell apparatus in which the drive electrodes COML are not shared.

In a case where a display apparatus with a touch detection is an on-cell apparatus or an out-cell apparatus, the drive electrodes COML used for at least one of touch detection and force detection according to the first embodiment and the other embodiments and modifications are provided as components different from the drive electrodes COML provided in the first substrate 2. Whether to provide a display device is optionally determined. In other words, the detecting apparatus may include only the touch detecting device 30 according to the first embodiment and the other embodiments and modifications and the configuration relating to the operations of the touch detecting device 30, for example. In a case where a display device is provided, the configuration of the display device may be optionally determined. The display device may be a display device other than liquid crystal display devices, such as an organic EL display device.

Figure 57:
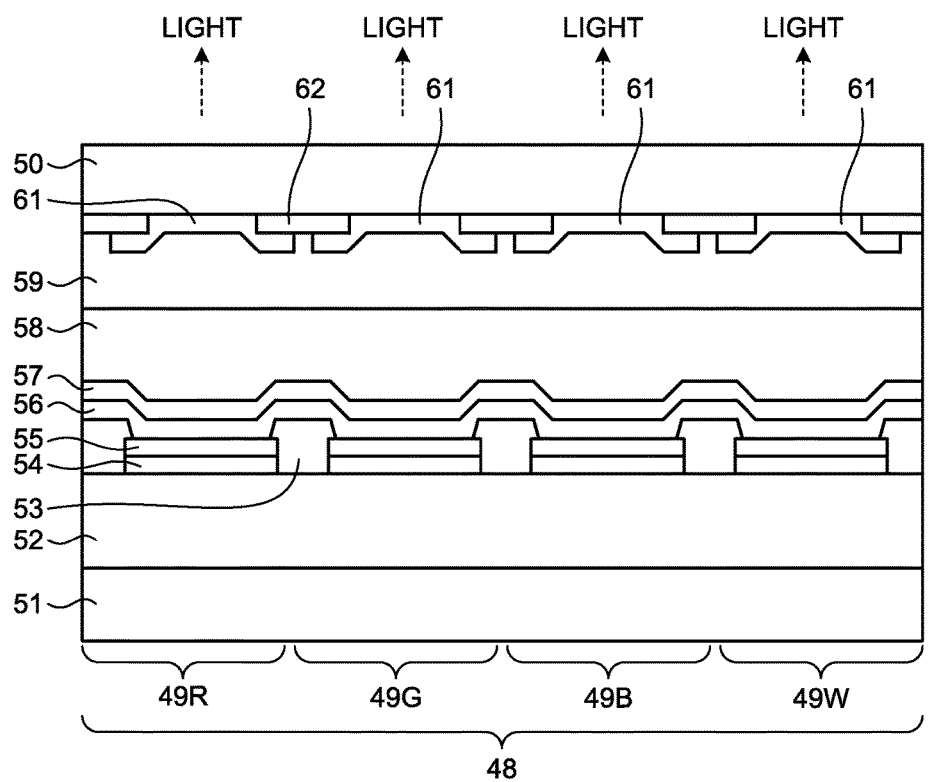
FIG. 57 is a diagram of an example of a sectional structure of an organic EL display device.

FIG. 57 is a diagram of an example of a sectional structure of an organic EL display device. The image display panel includes pixels 48 arranged in a two-dimensional matrix in the row direction and the column direction and displays an image of each display frame.

The pixels 48 each include a plurality of sub-pixels 49. A lighting drive circuit includes a control transistor, a drive transistor, and a charge retention capacitor. The gate of the control transistor is coupled to a scanning line, the source thereof is coupled to a signal line, and the drain thereof is coupled to the gate of the drive transistor. A first end of the charge retention capacitor is coupled to the gate of the drive transistor, and a second end thereof is coupled to the source of the drive transistor. The source of the drive transistor is coupled to a power supply line, and the drain thereof is coupled to the anode of an organic light-emitting diode serving as a light emitter. The cathode of the organic light-emitting diode is coupled to a reference potential (e.g., the ground), for example. The control transistor is an re-channel transistor, and the drive transistor is a p-channel transistor, for example. The polarities of the respective transistors are not limited thereto. The polarities of the control transistor and the drive transistor may be determined as needed.

The pixels 48 each include a first sub-pixel 49R, a second sub-pixel 49G, a third sub-pixel 49B, and a fourth sub-pixel 49W, for example. The first sub-pixel 49R, the second sub-pixel 49G, the third sub-pixel 49B, and the fourth sub-pixel 49W are arrayed in a stripe pattern in one direction, for example. The first sub-pixel 49R displays a primary color of red serving as a first color. The second sub-pixel 49G displays a primary color of green serving as a second color. The third sub-pixel 49B displays a primary color of blue serving as a third color. The fourth sub-pixel 49W displays white serving as a fourth color different from the first, the second, and the third colors. The first color, the second color, the third color, and the fourth color are not limited to red, green, blue, and white, respectively, and may be desired colors, such as complimentary colors.

As illustrated in FIG. 57, the image display panel includes a substrate 51, insulation layers 52 and 53, a reflective layer 54, lower electrodes 55, a light-emitting layer 56, upper electrodes 57, an insulation layer 58, an insulation layer 59, color filters 61 serving as a color conversion layer, a black matrix 62 serving as a light-shielding layer, and a substrate 50. The substrate 51 is a semiconductor substrate made of silicon, a glass substrate, or a resin substrate, for example, and includes or holds the lighting drive circuit. The insulation layer 52 is a protective film that protects the lighting drive circuit and is made of silicon oxide or silicon nitride, for example. The first sub-pixel 49R, the second sub-pixel 49G, the third sub-pixel 49B, and the fourth sub-pixel 49W each are provided with the lower electrode 55. The lower electrode 55 is a conductor serving as the anode (positive electrode) of the organic light-emitting diode. The lower electrode 55 is a translucent electrode made of a translucent conductive material (translucent conductive oxide), such as indium tin oxide (ITO). The insulation layer 53 is called a bank and separates the first sub-pixel 49R, the second sub-pixel 49G, the third sub-pixel 49B, and the fourth sub-pixel 49W from each other. The reflective layer 54 is made of a material having metallic luster, such as silver, aluminum, and gold, that reflects light from the light-emitting layer 56. The light-emitting layer 56 is made of an organic material and includes a hole injection layer, a hole transport layer, a luminous layer, an electron transport layer, and an electron injection layer, which are not illustrated.

Hole Transport Layer

A layer that generates a hole is preferably a layer including an aromatic amine compound and a substance having an electron-accepting property for the compound, for example. The aromatic amine compound is a substance having an arylamine skeleton. Among aromatic amine compounds, preferably used is an aromatic amine compound including triphenylamine in the skeleton and having a molecular weight of equal to or larger than 400. Among aromatic amine compounds having triphenylamine in the skeleton, preferably used is an aromatic amine compound including a condensed aromatic ring, such as a naphthyl group, in the skeleton. By using the aromatic amine compound including triphenylamine and a condensed aromatic ring in the skeleton, the heat resistance of light emitting elements can be improved. Examples of the aromatic amine compound include, but are not limited to, 4,4'-bis[N-(1-naphthyl)-N-phenylamino]biphenyl (abbreviation: α-NPD), 4,4'-bis[N-(3-methylphenyl)-N-phenylamino]biphenyl (abbreviation: TPD), 4,4',4''-tris(N,N-diphenylamino)triphenylamine (abbreviation: TDATA), 4,4',4''-tris[N-(3-methylphenyl)-N-phenylamino]triphenylamine (abbreviation: MTDATA), 4,4'-bis[N-{4-(N,N-di-m-tolylamino)phenyl}-N-phenylamino]biphenyl (abbreviation: DNTPD), 1,3,5-tris[N,N-di(m-tolyl)amino]benzene (abbreviation: m-MTDAB), 4,4',4''-tris(N-carbazolyl)triphenylamine (abbreviation: TCTA), 2,3-bis(4-diphenylaminophenyl)quinoxaline (abbreviation: TPAQn), 2,2',3,3'-tetrakis(4-diphenylaminophenyl)-6,6'-bisquinoxaline (abbreviation: D-TriPhAQn), 2,3-bis{4-[N-(1-naphthyl)-N-phenylamino]phenyl}-dibenzo[f,h]quinoxaline (abbreviation: NPADiBzQn), etc. The substance having an electron-accepting property for the aromatic amine compound is not particularly restricted. Examples of the substance include, but are not limited to, molybdenum oxide, vanadium oxide, 7,7,8,8-tetracyanoquinodimethane (abbreviation: TCNQ), 2,3,5,6-tetrafluoro-7,7,8,8-tetracyanoquinodimethane (abbreviation: F4-TCNQ), etc.

Electron Injection Layer and Electron Transport Layer

An electron transport substance is not particularly restricted. Examples of the electron transport substance include, but are not limited to, a metal complex, such as tris(8-quinolinolato)aluminum (abbreviation: $Alq_3$), tris(4-methyl-8-quinolinolato)aluminum (abbreviation: $Almq_3$), bis(10-hydroxybenzo[h]-quinolinato)beryllium (abbreviation: $BeBq_2$), bis(2-methyl-8-quinolinolato)-4-phenylphenolate-aluminum (abbreviation: BAlq), bis[2-(2-hydroxyphenyl)benzoxazolate]zinc (abbreviation: $Zn(BOX)_2$), and bis[2-(2-hydroxyphenyl)benzothiazolate]zinc (abbreviation: $Zn(BTZ)_2$), 2-(4-biphenyl)-5-(4-tert-butylphenyl)-1,3,4-oxadiazole (abbreviation: PBD), 1,3-bis[5-(p-tert-butylphenyl)-1,3,4-oxadiazole-2-yl]benzene (abbreviation: OXD-7), 3-(4-tert-butylphenyl)-4-phenyl-5-(4-biphenyl)-1,2,4-triazole (abbreviation: TAZ), 3-(4-tert-butylphenyl)-4-(4-ethylphenyl)-5-(4-biphenyl)-1,2,4-triazole (abbreviation: p-EtTAZ), bathophenanthroline (abbreviation: BPhen), bathocuproine (abbreviation: BCP), etc. A substance having an electron-donating property for the electron transport substance is not particularly restricted. Examples of the substance include, but are not limited to, alkali metal such as lithium and cesium, alkaline-earth metal such as magnesium and calcium, rare-earth metal such as erbium and ytterbium, etc. A substance selected from alkali metal oxide and alkaline-earth metal oxide, such as lithium oxide ($Li_2O$), calcium oxide (CaO), sodium oxide ($Na_2O$), potassium oxide ($K_2O$), and magnesium oxide (MgO), may be used as a substance having an electron-donating property for the electron transport substance.

Luminous Layer

To cause the luminous layer to emit red light, for example, a substance that emits light having a peak of an emission spectrum of 600 nm to 680 nm may be used. Examples of the substance include, but are not limited to, 4-dicyanomethylene-2-isopropyl-6-[2-(1,1,7,7-tetramethyljulolidine-9-yl)ethenyl]-4H-pyran (abbreviation: DCJTI), 4-dicyanomethylene-2-methyl-6-[2-(1,1,7,7-tetramethyljulolidine-9-yl) ethenyl]-4H-pyran (abbreviation: DCJT), 4-dicyanomethylene-2-tert-butyl-6-[2-(1,1,7,7-tetramethyl-julolidine-9-yl)ethenyl]-4H-pyran (abbreviation: DCJTB), periflanthene, 2,5-dicyano-1,4-bis[2-(10-methoxy-1,1,7,7-tetramethyljulolidine-9-yl)ethenyl]benzene, etc. To cause the luminous layer to emit green light, a substance that emits light having a peak of an emission spectrum of 500 nm to 550 nm may be used. Examples of the substance include, but are not limited to, N,N'-dimethylquinacridone (abbreviation: DMQd), coumalin 6, coumalin 545T, tris(8-quinolinolato)aluminum (abbreviation: $Alq_3$), etc. To cause the luminous layer to emit blue light, a substance that emits light having a peak of an emission spectrum of 420 nm to 500 nm may be used. Examples of the substance include, but are not limited to, 9,10-bis(2-naphthyl)-tert-butylanthracene (abbreviation: t-BuDNA), 9,9'-bianthryl, 9,10-diphenylanthracene (abbreviation: DPA), 9,10-bis(2-naphthyl)-anthracene (abbreviation: DNA), bis(2-methyl-8-quinolinolato)-4-phenylphenolate-gallium (abbreviation: BGaq), bis(2-methyl-8-quinolinolato)-4-phenylphenolate-aluminum (abbreviation: BAlq), etc. Besides the substances that emit fluorescence described above, a substance that emits phosphorescence may be used as the light-emitting substance. Examples of the substance include, but are not limited to, bis[2-(3,5-bis (trifluoromethyl)phenyl)pyridinate-N,C2']iridium(III)picolinate (abbreviation: $Ir(CF_3ppy)_2(pic)$), bis[2-(4,6-difluorophenyl)pyridinate-N,C2']iridium(III)acetylacetonate (abbreviation: FIr(acac)), bis[2-(4,6-difluorophenyl)pyridinate-N,C2']iridium(III)picolinate (abbreviation: FIr(pic)), tris(2-phenylpyridinate-N,C2')iridium (abbreviation: $Ir(ppy)_3$), etc.

The upper electrode 57 is a translucent electrode made of a translucent conductive material (translucent conductive oxide), such as ITO. While the sixth embodiment uses ITO as an example of the translucent conductive material, the material is not limited thereto. A conductive material having a different composition, such as indium zinc oxide (IZO), may be used as the translucent conductive material. The upper electrode 57 serves as the cathode (negative electrode) of the organic light-emitting diode. The insulation layer 58 is a sealing layer that seals the upper electrode 57 and is made of silicon oxide or silicon nitride, for example. The insulation layer 59 is a planarization layer that suppresses unevenness caused by the bank and is made of silicon oxide or silicon nitride, for example. The substrate 50 is a translucent substrate that protects the entire image display panel and may be a glass substrate, for example. While the lower electrode 55 serves as the anode (positive electrode), and the upper electrode 57 serves as the cathode (negative electrode) in FIG. 57, for example, the embodiment is not limited thereto. Alternatively, the lower electrode 55 may serve as the cathode, and the upper electrode 57 may serve as the anode. In this case, the polarity of the drive transistor electrically coupled to the lower electrode 55 may be appropriately changed. The order of lamination of a carrier injection layer (the hole injection layer and the electron injection layer), a carrier transport layer (the hole transport layer and the electron transport layer), and the luminous layer may be appropriately changed.

In a case where the electrode and the strain gauge in the display apparatus are integrated like in the sixth embodiment and the third modification, for example, the upper electrode 57 is integrated with the force detector (e.g., one of the force detectors 91, 92, 93, and 94 and the force detectors 91A, 92A, 93A, and 94A) in a similar manner to the drive electrode COML according to the sixth embodiment and the third modification.

The image display panel is a color display panel and includes the color filters 61. The color filters 61 are arranged between the respective sub-pixels 49 and an image observer to transmit light in colors corresponding to the colors of the respective sub-pixels 49 out of the luminous components of the light-emitting layer 56. The image display panel can emit light in colors corresponding to red, green, blue, and white. The color filter 61 is not necessarily arranged between the fourth sub-pixel 49W corresponding to white and the image observer. The image display panel can emit light in the colors corresponding to the first sub-pixel 49R, the second sub-pixel 49G, the third sub-pixel 49B, and the fourth sub-pixel 49W without transmitting the luminous component of the light-emitting layer 56 through the color conversion layer, such as the color filters 61. The fourth sub-pixel 49W in the image display panel, for example, may be provided with a transparent resin layer instead of the color filter 61 for color adjustment. With the transparent resin layer, the image display panel can suppress great unevenness on the fourth sub-pixel 49W. The fourth sub-pixel 49W is not limited to a white sub-pixel and may be a sub-pixel of another high luminance color, such as a yellow sub-pixel. In a case where a yellow sub-pixel is used as the fourth sub-pixel 49W, the image display panel may include a white light-emitting layer 56 and a yellow color filter 61 or the light-emitting layer 56 that emits yellow light.

Other advantageous effects that are provided by the aspects described above and that are obvious from the present specification or appropriately conceivable by those skilled in the art are naturally provided by the present invention.

What is claimed is:

1. A detecting apparatus comprising:
   a plurality of touch detection electrodes provided on a touch detection surface;
   a detection circuit;
   a plurality of first wires each having a first end connected to a corresponding touch detection electrode with a strain gauge there-between and a second end connected to the detection circuit; and
   a plurality of second wires each having a third end directly connected to a corresponding touch detection electrode and a fourth end connected to the detection circuit,
   wherein the detection circuit detects force based on difference between a first output from the second end in touch detection based on a capacitance of the corresponding touch detection electrode and a second output from the fourth end in touch detection based on a capacitance of the corresponding touch detection electrode.

2. The detecting apparatus according to claim 1, further comprising a plurality of driving electrodes each extending in a first direction and arranged in a second direction crossing the first direction,
   wherein the plurality of touch detection electrodes, each extending in the second direction, are arranged to cross the plurality of driving electrodes, and detect an external object based on a mutual capacitive detection method.

3. The detecting apparatus according to claim 1,
   wherein the plurality of touch detection electrodes are arranged in a matrix, and detect an external object based on a self-capacitive detection method.

4. The detecting apparatus according to claim 3,
   wherein each of the touch detection electrodes is in a looped shape surrounding the strain gauge.

5. A display apparatus comprising:
   a plurality of pixels arranged in a matrix;
   a plurality of touch detection electrodes provided on a touch detection surface;
   a detection circuit;
   a plurality of first wires each having a first end connected to a corresponding touch detection electrode with a strain gauge there-between and a second end connected to the detection circuit; and
   a plurality of second wires each having a third end directly connected to a corresponding touch detection electrode and a fourth end connected to the detection circuit,
   wherein the detection circuit detects force based on difference between a first output from the second end in touch detection based on a capacitance of the corresponding touch detection electrode and a second output from the fourth end in touch detection based on a capacitance of the corresponding touch detection electrode.

6. The display apparatus according to claim 5, further comprising a plurality of driving electrodes each extending in a first direction and arranged in a second direction crossing the first direction,
   wherein the plurality of touch detection electrodes, each extending in the second direction, are arranged to cross the plurality of driving electrodes, and detect an external object based on a mutual capacitive detection method.

7. The display apparatus according to claim 5,
   wherein the plurality of touch detection electrodes are arranged in a matrix, and detect an external object based on a self-capacitive detection method.

8. The display apparatus according to claim 7,
   wherein each of the touch detection electrodes is in a looped shape surrounding the strain gauge.

* * * * *